US011976012B2

(12) United States Patent
Kuchibhotla et al.

(10) Patent No.: US 11,976,012 B2
(45) Date of Patent: May 7, 2024

(54) CORDIERITE-CONTAINING CERAMIC BODIES, BATCH COMPOSITION MIXTURES, AND METHODS OF MANUFACTURING CORDIERITE-CONTAINING CERAMIC BODIES

(71) Applicant: CORNING INCORPORATED, Corning, NY (US)

(72) Inventors: Huthavahana Sarma Kuchibhotla, San Jose, CA (US); Cameron Wayne Tanner, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 272 days.

(21) Appl. No.: 17/294,121

(22) PCT Filed: Nov. 6, 2019

(86) PCT No.: PCT/US2019/060012
§ 371 (c)(1),
(2) Date: May 14, 2021

(87) PCT Pub. No.: WO2020/101968
PCT Pub. Date: May 22, 2020

(65) Prior Publication Data

US 2022/0009843 A1 Jan. 13, 2022

Related U.S. Application Data

(60) Provisional application No. 62/768,532, filed on Nov. 16, 2018.

(51) Int. Cl.
*B01D 46/00* (2022.01)
*B01D 46/24* (2006.01)
(Continued)

(52) U.S. Cl.
CPC ...... *C04B 38/0006* (2013.01); *B01D 46/2429* (2013.01); *B01D 46/24491* (2021.08);
(Continued)

(58) Field of Classification Search
CPC ............. C04B 38/0006; C04B 35/195; C04B 38/0054; B01D 46/24491;
(Continued)

(56) References Cited

U.S. PATENT DOCUMENTS 3,885,977 A 5/1975 Lachman et al.
4,329,162 A 5/1982 Pitcher, Jr.
(Continued)

FOREIGN PATENT DOCUMENTS

CN 1845885 A 10/2006
CN 101316805 A 12/2008
(Continued)

OTHER PUBLICATIONS

"Ceramic Membrane Filtration System", Metawater Co. Ltd, c/o Fuji Electric Corp. of America, 5221 Mulhauser Road, West Chester Township, OH 45011, Retrieved from: http://usa.metawater.com/product/ceramic/index.html, 2 pages.
(Continued)

*Primary Examiner* — Robert A Hopkins
(74) *Attorney, Agent, or Firm* — Russell S. Magaziner

(57) ABSTRACT

A cordierite-containing ceramic body with % P≥50%, df≤0.50, and a combined weight percentage of crystalline phases containing cordierite and indialite of at least 85 wt %. The porous ceramic body contains, as expressed on a relative oxide weight percent basis in terms of MgO, $Al_2O_3$, and $SiO_2$ that is within a field defined by (15.4, 34.1, and 50.5), (12.2, 34.1, and 53.7), (13.3, 31.2, and 55.5), and (16.6, 31.1, and 52.3). Batch composition mixtures and
(Continued)

methods of manufacturing a porous ceramic body using the batch compositions are provided, as are other aspects.

18 Claims, 5 Drawing Sheets

(51) Int. Cl.
*C04B 35/195* (2006.01)
*C04B 38/00* (2006.01)
*F01N 3/28* (2006.01)

(52) U.S. Cl.
CPC . *B01D 46/24492* (2021.08); *B01D 46/24494* (2021.08); *B01D 46/2484* (2021.08); *B01D 46/249* (2021.08); *B01D 46/2498* (2021.08); *C04B 35/195* (2013.01); *C04B 38/0054* (2013.01); *B01D 2279/30* (2013.01); *C04B 2235/3481* (2013.01); *C04B 2235/447* (2013.01); *C04B 2235/9607* (2013.01); *F01N 3/2825* (2013.01); *F01N 2330/06* (2013.01)

(58) Field of Classification Search
CPC .......... B01D 46/24494; B01D 46/2484; B01D 46/24492; B01D 46/249; B01D 46/2498; B01D 2279/30; B04B 2235/3481; B04B 2235/447; B04B 2235/9607; F01N 3/2825; F01N 2330/06
USPC ............................................................ 55/523
See application file for complete search history.

(56) References Cited

U.S. PATENT DOCUMENTS

| | | | |
|---|---|---|---|
| 4,417,908 A | 11/1983 | Pitcher, Jr. | |
| 4,557,773 A | 12/1985 | Bonzo | |
| 5,183,608 A | 2/1993 | Guile | |
| 5,258,150 A | 11/1993 | Merkel et al. | |
| 6,210,626 B1 | 4/2001 | Cornelius et al. | |
| 6,259,078 B1 | 7/2001 | Araya | |
| 6,319,870 B1 | 11/2001 | Beall et al. | |
| 6,368,992 B1 | 4/2002 | Beall et al. | |
| 6,391,813 B1 | 5/2002 | Merkel | |
| 6,432,856 B1 | 8/2002 | Beall et al. | |
| 6,576,579 B2 | 6/2003 | Merkel | |
| 6,673,300 B2 | 1/2004 | Allen et al. | |
| 6,696,132 B2 | 2/2004 | Beall et al. | |
| 6,773,657 B2 | 8/2004 | Beall et al. | |
| 6,818,580 B2 | 11/2004 | Kumazawa et al. | |
| 6,849,181 B2 | 2/2005 | Ogunwumi et al. | |
| 6,864,198 B2 | 3/2005 | Merkel | |
| RE38,888 E | 11/2005 | Beall et al. | |
| 7,247,184 B2 | 7/2007 | Frost | |
| 7,341,970 B2 | 3/2008 | Beall et al. | |
| 7,485,170 B2 | 2/2009 | Beall et al. | |
| 7,575,618 B2 | 8/2009 | Miao et al. | |
| 7,596,885 B2 | 10/2009 | Adrian et al. | |
| 7,601,194 B2 | 10/2009 | Beall et al. | |
| 7,648,548 B2 * | 1/2010 | Miao | B01D 46/24491 422/177 |
| 7,648,550 B2 | 1/2010 | Beall et al. | |
| 7,704,442 B2 | 4/2010 | Noguchi et al. | |
| 7,744,669 B2 | 6/2010 | Paisley et al. | |
| 7,744,670 B2 | 6/2010 | Miao et al. | |
| 7,887,897 B2 | 2/2011 | Lu et al. | |
| 7,922,951 B2 | 4/2011 | Mudd et al. | |
| 7,923,093 B2 | 4/2011 | Melscoet-Chauvel et al. | |
| 7,960,009 B2 | 6/2011 | Backhaus-Ricoult et al. | |
| 7,981,188 B2 | 7/2011 | Miao et al. | |
| 8,007,557 B2 | 8/2011 | Merkel | |
| 8,058,198 B2 | 11/2011 | Yamazaki et al. | |
| 8,187,525 B2 | 5/2012 | Custer et al. | |
| 8,236,083 B2 | 8/2012 | Garcia et al. | |
| 8,283,282 B2 | 10/2012 | Noguchi et al. | |
| 8,298,311 B2 | 10/2012 | Chen et al. | |
| 8,407,915 B2 | 4/2013 | George et al. | |
| 8,501,296 B2 | 8/2013 | Merkel | |
| 8,512,433 B2 | 8/2013 | Beall et al. | |
| 8,530,029 B2 | 9/2013 | Lu et al. | |
| 8,591,800 B2 | 11/2013 | Noguchi et al. | |
| 8,609,032 B2 | 12/2013 | Boger et al. | |
| 8,623,287 B2 | 1/2014 | Ramberg et al. | |
| 8,673,064 B2 | 3/2014 | Ahmed et al. | |
| 8,673,207 B1 | 3/2014 | Boger et al. | |
| 8,709,557 B2 | 4/2014 | Rivard | |
| 8,709,577 B2 | 4/2014 | Beall et al. | |
| 8,741,210 B2 | 6/2014 | Merkel et al. | |
| 8,821,803 B2 | 9/2014 | Ramberg et al. | |
| 8,843,822 B2 | 9/2014 | Claux et al. | |
| 8,844,752 B2 | 9/2014 | Sirota et al. | |
| 9,038,284 B2 | 5/2015 | Feldman et al. | |
| 9,079,799 B2 | 7/2015 | Divens-Dutcher et al. | |
| 9,085,089 B2 | 7/2015 | Noni et al. | |
| 9,314,727 B2 | 4/2016 | Lu et al. | |
| 9,334,191 B2 | 5/2016 | Miao et al. | |
| 9,335,093 B2 | 5/2016 | Feldman et al. | |
| 9,440,373 B2 | 9/2016 | Feldman et al. | |
| 9,757,675 B2 | 9/2017 | He et al. | |
| 2003/0165661 A1 * | 9/2003 | Noguchi | B01D 39/2086 428/116 |
| 2004/0029707 A1 | 2/2004 | Beall et al. | |
| 2004/0261384 A1 | 12/2004 | Merkel et al. | |
| 2007/0166564 A1 | 7/2007 | Morimoto et al. | |
| 2008/0110143 A1 | 5/2008 | Chen et al. | |
| 2009/0220733 A1 | 9/2009 | Backhaus-Ricoult et al. | |
| 2010/0304082 A1 * | 12/2010 | Merkel | C04B 35/195 428/116 |
| 2012/0134891 A1 * | 5/2012 | Boger | B01D 46/2455 422/211 |
| 2015/0183087 A1 | 7/2015 | Liebelt et al. | |
| 2016/0347665 A1 | 12/2016 | Divens-Dutcher et al. | |

FOREIGN PATENT DOCUMENTS

| | | | |
|---|---|---|---|
| CN | 101484403 A | | 7/2009 |
| CN | 102007088 A | | 4/2011 |
| CN | 102630220 A | | 8/2012 |
| CN | 105283429 A | | 1/2016 |
| CN | 105848753 A | | 8/2016 |
| EP | 0232621 A2 | | 8/1987 |
| EP | 1666436 A1 | | 6/2006 |
| JP | 2010-509066 A | | 3/2010 |
| JP | 2011521868 A | * | 7/2011 |
| JP | 2015-051921 A | | 3/2015 |
| WO | 2005/094967 A1 | | 10/2005 |
| WO | 2015/042499 A2 | | 3/2015 |

OTHER PUBLICATIONS

A-TECH innovations, gmbh, Am Wiesenbusch 26, 45966 Gladbeck, Germany, http://www.atech-innovations.com/products/membranes.html.

Camerucci et al., Sintering of Cordierite Based Materials, Ceramic International, 29:159-168 (2003).

Camerucci et al., Wetting and penetration of cordierite and mullite materials by non-stoichiometric cordierite liquids, Ceramics International, 34:1753-1762 (2008).

Chinese Patent Application No. 201980088722.8, Office Action dated Mar. 9, 2022, 18 pages (8 pages of English Translation and 10 pages of Original document), Chinese Patent Office.

Das et al., Effect of Size Distribution of the Starting Powder on the Pore Size and its Distribution of Tape Cast Alumina Microporous Membranes, J. Eur. Ceram. Soc., 19:341-345 (1999).

Hasselman et al., Analysis of Thermal Stress Resistance of Microcracked Brittle Ceramics, Ceramic Bulletin, 58:856-860 (1979).

He et al., Passenger car fuel-efficiency, 2020-2025—Comparing stringency and technology feasibility of the Chinese and US standards, published by the International Council on Clean Transportation, 2013, 16 pages.

(56) References Cited

OTHER PUBLICATIONS

Heibel, Advanced Diesel Particulate Filter Design for Lifetime Pressure Drop Solution in Light Duty Applications, SAE Technical Paper, 2007-01-0042, 2007, doi:10.4271/2007-01-0042.

Ichikawa et al., Material Development of High Porous SiC for Catalyzed Diesel Particulate Filters, SAE Technical Paper, 2003-01-0380, Mar. 3, 2003.

International Search Report and Written Opinion of the International Searching Authority; PCT/US19/60012, dated Apr. 2, 2020; 9 Pages; European Patent Office.

Japanese Patent Application No. 2021-526794, Office Action dated Jul. 28, 2022, 5 pages (English Translation only), Japanese Patent Office.

Jørgensen et al., Optimization of protein fractionation by skim milk microfiltration: Choice of ceramic membrane pore size and filtration temperature, J. Dairy Science, 99:6164-6179 (2016).

Latella, Permeability and high temperature strength of porous mullite-alumina ceramics for hot gas filtration, J. Mater. Sci., 41:423-30, 2006, 8 pages.

Maricq, How are emissions of nuclei mode particles affected by new PM control technologies and fuels?, Ford Motor Company, Health Effects Institute Annual Conference, 2009.

Mei et al., Microstructural evolution in sol±gel derived P2O5-doped cordierite powders, J. Eur. Ceram. Soc., 20:2191-2197 (2000).

Merkel et al., New cordierite diesel particulate filters for catalyzed and non-catalyzed applications, in Proc. 6th Int. Congress on Catalysis and Automotive Pollution Control, Aug. 2003, 9 pages.

Naseri et al., Development of SCR on Diesel Particulate Filter System for Heavy Duty Applications, SAE International Journal of Engines, 4(1):1798-1809 (2011).

Ogyu et al., Development of High Porosity SiC-DPF Which is Compatible with High Robustness and Catalyst Coating Capability for SCR Coated DPF Application, SAE Technical Paper 2013-01-0840, Apr. 8, 2013.

Ohara et al., Filtration Behavior of Diesel Particulate Filters (1), SAE Technical Paper, 1007-01-0921, Apr. 16, 2007.

Pall, Corporation, 25 Harbor Park Drive, Port Washington, NY, https://shop.pall.com/us/en/chemicals-polymer/chemicals/chemicals-raw-material-/-gas/air/aerolith-ceramic-products-zidgri781w6.

Schreyer et al., Compositions and Structural States of Anhydrous Mg-Cordierites: A Re-investigation of the Central Part of the System MgO—Al2O3—SiO2, J. Petrol., 2:324-406 (1961).

Seong et al., Particulate Emissions Control by Advanced Filtration Systems for GDI Engines (ANL/Corning/Hyundai CRADA, Dept. of Energy Project Id: ACE024, Jun. 11, 2015, 29 pages.

Standard Test Method for Dynamic Young's Modulus, Shear Modulus, and Poisson's Ratio for Advanced Ceramics by Sonic Resonance, ASTM 1198-20, reapproved 2013.

Webb et al., Strength Size Effects in Cellular Ceramic Structures, Ceramic Engineering and Science Proceedings—Mechanical Properties and Performance of Engineering Ceramics II, 27(2):521-531 (2006).

\* cited by examiner

"Enlarged View"

CORDIERITE-CONTAINING CERAMIC BODIES, BATCH COMPOSITION MIXTURES, AND METHODS OF MANUFACTURING CORDIERITE-CONTAINING CERAMIC BODIES

This is a national stage application under 35 U.S.C. § 371 of International Application No. PCT/US2019/060012, filed on Nov. 6, 2019, which claims the benefit of priority under 35 U.S.C. § 119 of U.S. Provisional Application No. 62/768, 532 filed on Nov. 16, 2018, the content of which is incorporated herein by reference in its entirety.

FIELD

Example embodiments of the present disclosure relate to cordierite-containing ceramic bodies and more particularly to porous cordierite honeycomb bodies useful in engine exhaust after-treatment applications and the like.

BACKGROUND

Diesel particulate filters (DPF) and gasoline particulate filters (GPF) can be produced from a porous ceramic honeycomb body by plugging some channels to form a plugged honeycomb body. A portion of the cells at the inlet end and/or outlet end can be plugged with a plug. A portion of the channels can be plugged at the outlet end but not on the inlet end, while another portion can be plugged at the inlet end and not on the outlet end.

In operation, the exhaust gas flows through porous walls of the ceramic honeycomb body of the particulate filter. Along its flow path through the porous walls, particulates from the exhaust gas are retained by the honeycomb body. Thus particulates, such as soot particles, are filtered from the exhaust gas. A soot layer in the honeycomb body can be burned in a regeneration cycle so that the filter can be restored.

The above information disclosed in this Background section is only for enhancement of understanding of the disclosure and therefore it may contain information that does not form any part of the prior art nor what the prior art may suggest to a person of ordinary skill in the art.

SUMMARY

In one aspect, the present disclosure discloses a porous ceramic body comprising a predominant crystalline phase of non-stoichiometric cordierite that further comprises relatively high average bulk porosity and relatively narrow pore size distribution.

Preferably the ceramic bodies comprise a predominant crystalline phase of cordierite and that can optionally further contain $P_2O_5$ on an oxide basis based on the total amount of inorganics, wherein the bodies preferably comprise relatively high average bulk porosity and a relatively narrow pore size distribution.

In another aspect, the present disclosure discloses a batch composition mixture useful for the manufacture of a ceramic body comprising a non-stoichiometric cordierite-containing crystalline structure having relatively high average bulk porosity and a relatively narrow pore size distribution.

In another aspect, the present disclosure discloses a method for manufacturing a ceramic body comprising a cordierite-containing crystalline structure comprising relatively high average bulk porosity and relatively narrow pore size distribution.

Additional features of the disclosure will be set forth in the description which follows, and in part will be apparent from the description, or may be learned by practice of the embodiments disclosed herein.

Some embodiments disclosed herein comprise a porous ceramic body comprising a predominant cordierite crystalline phase and that has a composition on a relative oxide weight percent basis in terms of MgO, $Al_2O_3$, and $SiO_2$ that is within a field defined by (15.4, 34.1, and 50.5), (12.2, 34.1, and 53.7), (13.3, 31.2, and 55.5), and (16.6, 31.1, and 52.3); % P≥50%; and $d_f \leq 0.50$, wherein % P is an average bulk porosity by volume, and $d_f = (d_{50} - d_{10})/d_{50}$. The "relative oxide weight percent basis" is determined relative to only MgO, $Al_2O_3$, and $SiO_2$, combined.

In some embodiments, a porous ceramic honeycomb body is disclosed comprising a predominant crystalline phase of cordierite and a composition that contains between 0.1 wt % and 5.0 wt % $P_2O_5$ based on the total amount of inorganics; % P≥50%; and $d_f \leq 0.50$, wherein % P is an average bulk porosity by volume, and $d_f = (d_{50} - d_{10})/d_{50}$.

In some embodiments a batch composition mixture useful for forming a cordierite-containing ceramic body is disclosed. In some of these embodiments, the batch composition mixture comprises a magnesia source, an alumina source, and a silica source, expressed in relative weight percent on a relative oxide weight basis of in terms of MgO, $Al_2O_3$, and $SiO_2$, is within a field defined by (15.4, 34.1, and 50.5), (12.2, 34.1, and 53.7), (13.3, 31.2, and 55.5), and (16.6, 31.1, and 52.3).

In yet another aspect, a batch composition mixture useful for forming a cordierite-containing ceramic body is disclosed. The batch composition mixture comprises a magnesia source, an alumina source, a silica source, and optionally a phosphorous oxide source expressed in weight percent on an oxide basis of: 0.1 wt % to 5.0% wt % and 95% wt % to 99.9% wt % MgO, $Al_2O_3$, and $SiO_2$ as expressed on a relative oxide weight percent basis in terms of MgO, $Al_2O_3$, and $SiO_2$ that is within a field defined by (15.4, 34.1, and 50.5), (12.2, 34.1, and 53.7), (13.3, 31.2, and 55.5), and (16.6, 31.1, and 52.3).

In yet another aspect, a method of manufacturing a cordierite-containing porous ceramic body is disclosed herein. The method comprises providing inorganic ingredients comprising: a magnesia source in a range from 12.2 wt % to 16.6 wt %, an alumina source in a range from 31.1 wt % to 34.1 wt %, a silica source a range from 50.5 wt % to 55.5 wt %, and wherein the wt % of each of the magnesia source, alumina source, silica source are all based on 100% of a total weight of inorganics present; mixing the inorganic ingredients together with an organic binder, a pore former in a range from 24 wt % $SA_{pf}$ to 58 wt % $SA_{pf}$, and a liquid vehicle to form a batch composition mixture. The amount of former is given as a superaddition, wt % $SA_{pf}$ by weight to 100% of the total weight of the inorganics, and the binder and liquid vehicle are added as superadditions to 100% of the weight of the inorganics and pore former, in wt % SA. The batch composition can be shaped into a green body and fired under conditions effective to convert the green body into the porous ceramic body comprising a combined weight percentage of at least 85 wt % of crystalline phases containing cordierite and indialite and a MgO, $Al_2O_3$, and $SiO_2$ composition expressed in a relative oxide weight percent basis in terms of MgO, $Al_2O_3$, and $SiO_2$ that is within a field defined by (15.4, 34.1, and 50.5), (12.2, 34.1, and 53.7), (13.3, 31.2, and 55.5), and (16.6, 31.1, and 52.3).

It is to be understood that both the foregoing general description and the following detailed description provide numerous examples and are intended to provide further explanation of the disclosure.

BRIEF DESCRIPTION OF THE DRAWINGS

The accompanying drawings are included to provide a further understanding of the disclosure and are incorporated in and constitute a part of this specification, illustrate exemplary embodiments, and together with the description serve to explain the principles of the disclosure. The drawings are not necessarily drawn to scale. Like reference numerals are used to denote the same or substantially similar parts.

DETAILED DESCRIPTION

Figure 1A:
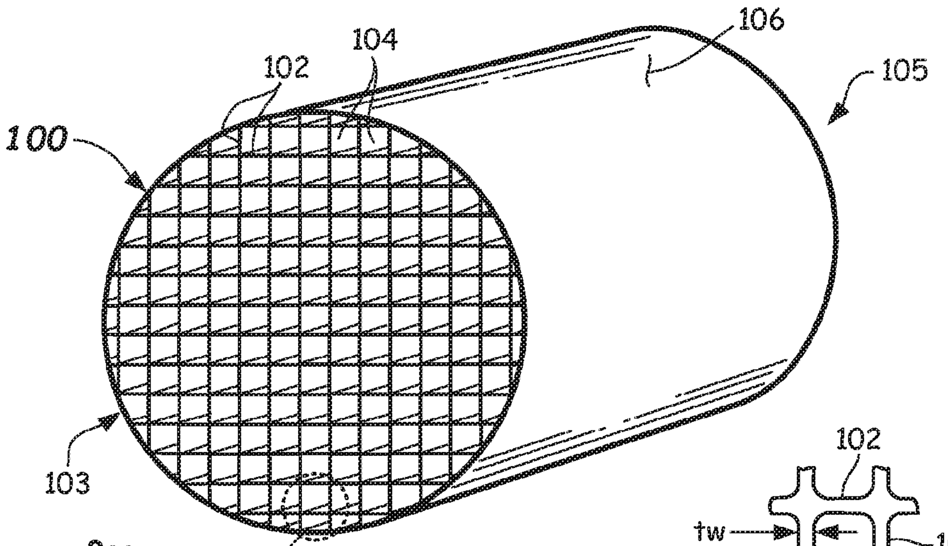
FIG. 1A schematically illustrates a perspective view of a ceramic body embodied as a honeycomb body comprising a cordierite and indialite crystalline structured ceramic material according to one or more embodiments of the disclosure.

The disclosure is described more fully hereinafter with reference to the accompanying drawings, in which example embodiments are shown. The disclosure may, however, be embodied in many different forms and should not be construed as limited to the embodiments set forth herein. Rather, these embodiments are provided so that this disclosure is thorough, and will fully convey the scope of the disclosure to those skilled in the art. In the drawings, the size and relative sizes of features and components may be exaggerated for clarity and thus may not be drawn to scale. Like reference numerals in the drawings may denote the same or similar elements.

It will be understood that when an element is referred to as being "on," "connected to," or "coupled to" another element, it can be directly on or directly connected to the other element, or an intervening or interconnecting element may be present. In contrast, when an element is referred to as being "directly on" or "directly connected to" or "directly coupled to" another element, there is no intervening element present.

Honeycomb bodies disclosed herein are preferably chemically durable in harsh environments, able to withstand high temperatures, such as above 900° C., thermal shock tolerant, and relatively strong and robust.

Furthermore, filters and honeycomb bodies as disclosed herein further preferably help to improve fuel economy and even further preferably at the same time to reduce emissions of carbon dioxide and other byproducts of combustion.

Preferably the porous ceramic honeycomb disclosed herein has a narrow the pore size distribution. The porous ceramic material, porous ceramic honeycombs and filters as disclosed herein are suitable in the GPF application. Cordierite with its relatively lower heat capacity is preferred. Also, the lower thermal expansion coefficient of cordierite can impart improved thermal shock resistance, and in some embodiments is suitable for hosting catalytic material, for example by integrating a Three Way Catalysts (TWC) function on the GPF, for example so that the GPF can light-off quickly to hold cold-start emissions below a desired level.

The present disclosure provides new compositions, batch mixtures, and methods of manufacturing honeycomb bodies that enable microstructure of porous cordierite-based materials to provide an advantageous combination of back pressure and filtration efficiency, such as in GPF application space.

Preferably, the porous ceramic body disclosed herein is a porous cordierite-containing body comprising a predominant cordierite phase with a microstructure that combines low $d_f$, and high average bulk porosity (% P), and can provide high $d_{50}$. The improved cordierite-containing ceramic material can provide unexpected and superior performance over known cordierite, AT, and SiC materials for GPF and DPF applications particularly in those applications with wall catalyst-containing washcoat.

In one set of embodiments, the disclosure provides a porous ceramic body (e.g., a porous ceramic honeycomb body), comprising a predominant crystalline phase containing cordierite, relatively high average bulk porosity by volume (e.g., % P≥50%), and relatively narrow pore size distribution (e.g., $d_f \leq 0.50$). For reference, $d_f$ is defined as $(d_{50}-d_{10})/d_{50}$ and is a measure of a relative width of the pore size distribution below the median pore diameter $d_{50}$. A smaller $d_f$ indicates a tighter pore size distribution of pores having sizes below the median pore diameter, $d_{50}$. Porosities and pore sizes can be measured by known mercury porosimetry techniques.

In some embodiments, the porous ceramic honeycomb body can comprise relatively high median pore diameter ($d_{50} \geq 8$ μm), such as 8 μm$\leq d_{50} \leq$22 μm in some embodiments. In some embodiments, the porous ceramic honeycomb body containing cordierite further comprises microcracks, which can lower the thermal expansion coefficient (CTE) to $15\times10^{-7}$/° C. or below as measured between 25° C. to 800° C., and provide CTE wherein $4\times10^{-7}$/° C. CTE $15\times10^{-7}$/° C. in some embodiments.

In some embodiments, the ceramic composition material can contain a dopant, such as phosphorous oxide ($P_2O_5$), wherein one function of the dopant can be to help generate a stable liquid during the reactive sintering process that preferably fills in some of the fine pores and then crystallizes upon cooling. In some embodiments, the porous ceramic body preferably comprises 58% or more by weight (e.g., 58%-85%) of materials with crystal structure of cordierite. The porous ceramic body can also comprise 12% or more by weight (e.g., 12 wt % to 32 wt %) of materials with crystal structure of indialite. In some embodiments, the porous ceramic body can comprise greater than 85% or more by weight (e.g., 85 wt % to 97 wt %) of materials with crystal structure of cordierite and indialite.

In some embodiments, the dopant functions to move from ideal 2:2:5 ratios of $MgO:Al_2O_3:SiO_2$ for stoichiometric cordierite toward $Mg_3Al_2Si_6O_{18}$ or $Mg_3Al_5P_3O_{18}$ by amounts of 5% to 22% and 2% to 14%, respectively. Thus, the composition of the ceramic material contains non-stoichiometric cordierite.

In some embodiments of the present disclosure, the porous ceramic bodies comprise non-stoichiometric cordierite, which can provide one or more advantages as compared to stoichiometric cordierite. For example, a pore size distribution of the porous ceramic body can be made narrower than those based upon nominally stoichiometric cordierite compositions. As a consequence, it is possible to produce filters and/or substrates from some embodiments of the porous ceramic bodies disclosed herein to have superior gas flow permeability, superior washcoat compatibility (especially with TWC and SCR catalysts), higher filtration efficiency, and/or enhanced selectivity. Furthermore, in some embodiments, finer inorganic raw materials can be used to produce the same or larger median pore diameter within the porous ceramic body. The liquid phase can form during sintering of the green body and can fill the finer spaces between inorganic particles, such that, for example, the resulting median pore diameter upon firing becomes more reflective of the particle size of the combustible pore former that is used in the batch composition. Additionally, in some embodiments honeycomb bodies disclosed herein or comprised of the porous ceramic material disclosed herein can be made to comprise thinner walls by extrusion, such as due to the use of finer inorganic particles in the batch. Moreover, in some embodiments, creation of a liquid phase that is formed such as during the highest temperature soak stage of the firing cycle, can help speed the reaction to form non-stoichiometric cordierite preferably even at modestly lower temperatures, with shorter soak durations, or combinations thereof.

Definitions

Cordierite—A magnesium aluminum cyclosilicate having the series formula: $(Mg,Fe)_2Al_3(Si_5AlO_{18})$ to $(Fe,Mg)_2Al_3(Si_5AlO_{18})$. Iron and nickel may be present in small amounts, i.e., less than 4 wt %. In some embodiments the cordierite phase contains no iron, or no nickel, or no iron and no nickel. The cordierite crystals preferably have a negative thermal expansion along one crystallographic axis to give the sintered ceramic material a low average thermal expansion coefficient.

Indialite—A high temperature polymorph aluminosilicate phase that is the hexagonal dimorph of cordierite, which is isostructural with beryl and has a random distribution of Al in the $(Si, Al)_6O_{18}$ rings. Indialite is compositionally similar to cordierite and also has negative thermal expansion along one crystallographic axis. The indialite may transform slowly into cordierite, and indialite is metastable below about 1250° C. Iron and nickel may be present in small amounts, i.e., less than 4 wt %. In some embodiments the indialite phase contains no iron, or no nickel, or no iron and no nickel.

Spinel—A hard crystalline phase material $MgAl_2O_4$ which may contain small quantities of dissolved iron and/or other impurities.

Sapphirine—A hard crystalline magnesium aluminosilicate.

Enstatite—An orthorhombic material $MgSiO_3$ of the pyroxene group, which may contain small quantities of dissolved iron and/or other impurities, Mullite—A crystalline aluminosilicate phase material.

Cristobalite—A high-temperature polymorph of silica, meaning that it has the same chemical formula as quartz ($SiO_2$) but a distinct crystal structure.

Amorphous phase—Typically a glass that contains predominantly silica and lesser amounts of alumina, magnesia, titania and oxide impurities of sodium, calcium, iron, and nickel.

Figure 1B:
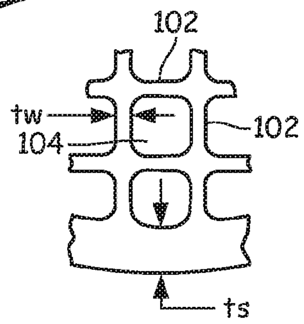
FIG. 1B schematically illustrates an enlarged end view of a portion of the ceramic honeycomb body of FIG. 1A illustrating an example all and skin structure according to one or more embodiments of the disclosure.

Various embodiments of the disclosure will now be described with reference to the Tables and FIGS. 1A-5 disclosed and described herein. In some embodiments, the porous ceramic body 100 may be embodied as a honeycomb body as shown in FIGS. 1A and 1B. The ceramic body 100 embodied as a honeycomb body can comprise a matrix of intersecting porous walls 102 forming a honeycomb of channels 104 that extend along an axial length of the porous ceramic body 100 from a first end 103 (e.g., an inlet end) to a second end 105 (e.g., an outlet end). In some embodiments, the channels 104 are co-parallel with one another. The channel shape in transverse cross-section, as outlined and defined by the walls 102 of each cell can be square such as shown in FIGS. 1A and 1B. In the transverse cross-section, a cell density, or average cell density, can be measured or calculated, for example it is possible to determine a cell density (or channel density) of the number of cells per area, such as cells per square inch, or cells per square centimeter. Other transverse cross-section channel shapes comprise rectangular (non-square), triangular, octagonal, hexagonal, diamond, circular, other polygonal shapes, combinations of the aforementioned, and the like. Further, the various cells (and therefore channels) may comprise rounded corners (as shown), chamfered corners, square corners, or combinations thereof.

The porous ceramic body 100 when configured as a honeycomb body can comprise a configuration having a transverse wall thickness Tw of the walls 102 ranging from 0.002 inch to 0.016 inch (0.05 mm to 0.41 mm—see FIG. 1B), or even 0.004 to 0.012 inch (0.10 mm to 0.30 mm) in some embodiments. Further, the intersecting porous walls 102 may be of a substantially constant thickness across the honeycomb body 100 or optionally may comprise different thicknesses. For example, the wall thickness tw of the intersecting porous walls 102 can be greater proximate the skin 106 of the porous ceramic body 100, such as in the last 1-5 channels, to provide a halo of thicker porous walls 102 near the skin 106 thereby improving structural strength and handling thereof. The skin 106 can comprise a thickness is from one to five tires the thickness of the transverse wall thickness Tw of the walls 102, for example.

Figure 1C:
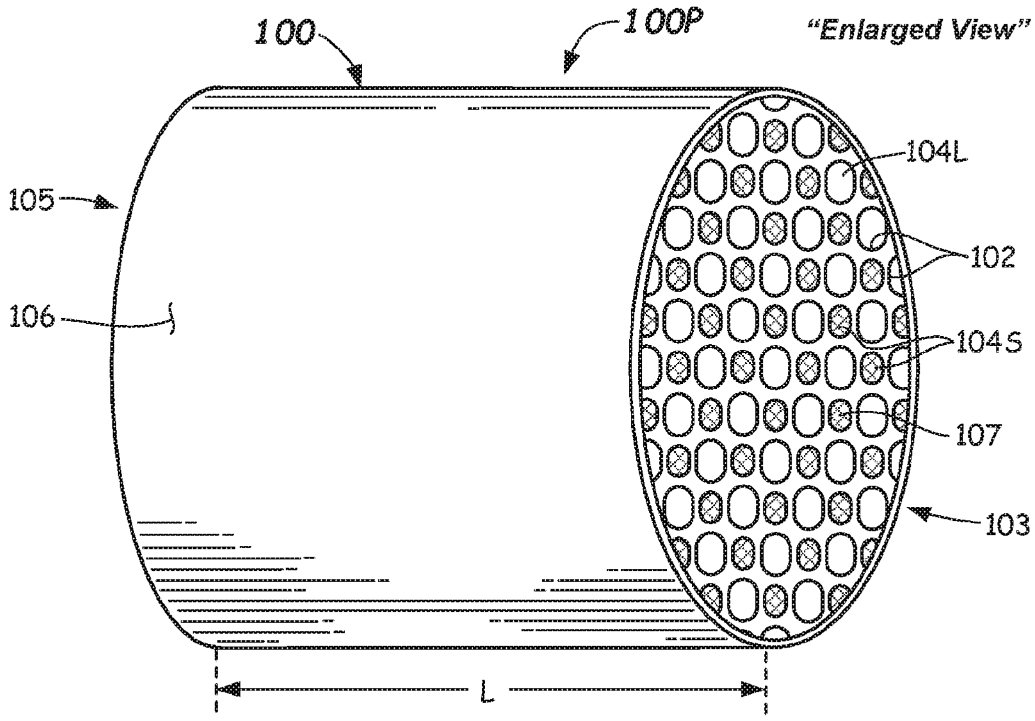
FIG. 1C illustrates a perspective view of a ceramic body embodied as a plugged honeycomb body comprising a cordierite and indialite crystalline structured ceramic material according to one or more embodiments of the disclosure.

In some embodiments, the porous ceramic body can be embodied as a plugged ceramic honeycomb body 100P, as shown in FIG. 1C. For example, the plugged ceramic honeycomb body 100P shown can be comprised in a particulate filter for diesel engine applications (as a DPF) or gasoline engine applications (as a GPF). In the plugged ceramic honeycomb body 100P, certain ones of the channels 104 of the honeycomb body 100 can be plugged with plugs 107 formed of a plugging material 107 at or near the ends thereof. In the depicted embodiment of FIG. 1C, some of the channels 104L can have a larger hydraulic area than other smaller channels 104S, such as described in, for example, U.S. Pat. Nos. 6,843,822; 6,696,132; 7,247,184; and 7,601,194. The smaller channels 104S can comprise the plugs 107 formed at or near the inlet end 103. The larger channels 104L can comprise similar plugs (like plugs 107) formed at or near the outlet end 103 (not shown). In other embodiments, the plugged ceramic honeycomb body 100P can comprise the same-sized inlet and outlet channels, such as disclosed in U.S. Pat. Nos. 4,329,162; 6,849,181; 8,236,083; and 8,512,433, for example. Other filter plugging patterns are possible as disclosed in U.S. Pat. Nos. 4,417,908; 8,844,752; 8,673,064; and 9,757,675, for example. All of the channels 104 may be plugged, or optionally, some of the channels may be unplugged. For example, only some (less than all) of the small channels 104S may be plugged. Likewise, only some (less than all) of the large channels 104L may be plugged. In some embodiments, the channels are plugged in offset checker-board patterns at the respective inlet and outlet ends. Exhaust gas laden with particulates enters large channels 104L and is blocked from directly exiting each channel 104L by a plug 107 and the gas is forced to pass through porous walls 102, which capture the particulates. An offset checker-board plugging pattern can maximize the number of inlet and outlet channels for low pressure drop and high filtration efficiency, however other plugged cell arrangements are possible according to honeycomb bodies of the present disclosure.

Cell Density

The porous ceramic body 100, when configured as a flow through honeycomb body (substrate) of FIG. 1A or plugged honeycomb body 100P of FIG. 1C, can have average cell densities (used interchangeably with channel density) ranging from 15.5 cells/cm$^2$ to 93 cells/cm$^2$ (100 cpsi to 600 cpsi), for example. Other cell densities can be used. Example geometries of the ceramic body 100 may have an average cell density CD of 400 cpsi (62 cells/cm$^2$) with a transverse wall thickness Tw of about 8 mils (0.20 mm) defined herein as a 400/8 porous ceramic honeycomb body, or an average cell density CD of 400 cpsi (62 cells/cm$^2$) and a transverse wall thickness Tw of about 6 mils (0.15 mm) and defined as a 400/6 porous ceramic honeycomb body. Other geometries of the porous ceramic body 100 can comprise, for example, combinations of average cell density CD/transverse wall thickness Tw of 100/17, 200/12, 200/19, 270/19, 300/8, 200/8, and 350/12. Other suitable combinations of cell density CD and transverse wall thickness Tw can be used.

The outermost cross-sectional shape of the ceramic body 100 (and the plugged honeycomb body 100P) may be of any desired outer shape in transverse cross-section, such as a circular shape (as shown in FIG. 1A and 1C), an ellipse, an oval, a triangular or tri-lobed shape, a racetrack shape, a square, a rectangular cross-sectional outer shape, pentagonal, hexagonal, octagonal, or other polygonal convex shape. However, the honeycomb body 100 and plugged honeycomb body 100P are not limited to these cross-sectional shapes. Other cross-sectional shapes may be used. Porous ceramic body 100 as used herein includes, but is not limited to, porous ceramic honeycomb bodies 100 as well as plugged ceramic honeycomb bodies 100P.

% P

Figure 4A:
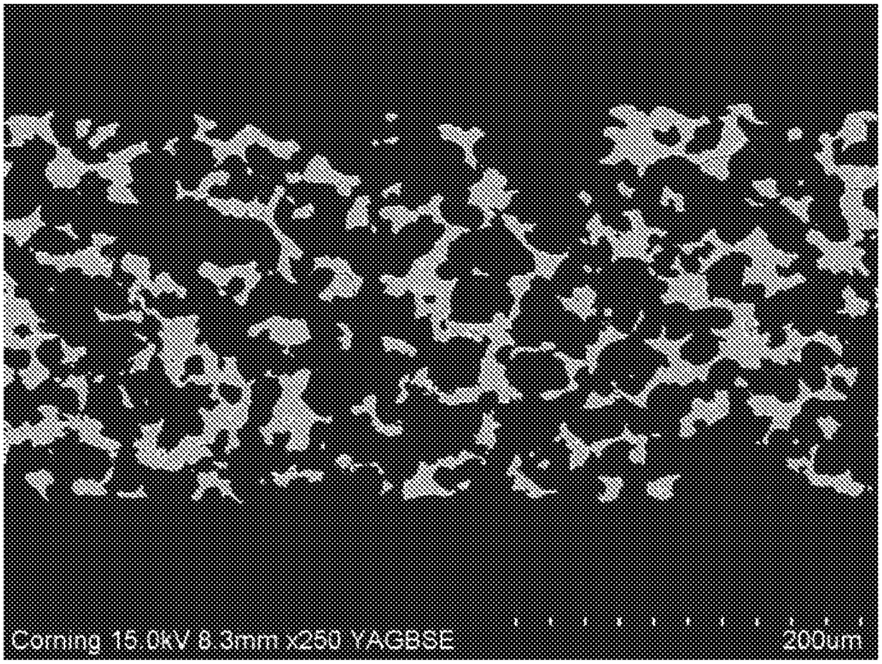
FIG. 4A illustrates a representative micrograph of polished cross-section of a porous wall of example porous ceramic body (e.g., example E3A) comprising a cordierite and indialite crystalline structured ceramic material according to one or more embodiments of the disclosure.

Example embodiments of the porous ceramic body 100 of the present disclosure can comprise a relatively high level of total bulk porosity (% P) that comprises open and interconnected porosity. See, for example, the micrograph of a porous wall 102 shown in FIG. 4A shown at 50× magnification, wherein the black areas in the wall are porosity and the grey areas are non-stoichiometric cordierite and indialite. For example, a porous ceramic body 100 of the composition described herein can comprise an average bulk porosity % P, wherein % P≥50%, % P≥55%, % P 60%, or even % P 65%, as determined by mercury intrusion porosimetry. In some embodiments, the average bulk porosity % P can be in a range of 50%≤% P≤72%, 55≤% P≤72%, 60%≤% P≤72%, or even 65%≤% P≤72%. Such ranges of % P in the porous ceramic body 100 of the present disclosure can provide low backpressures when in used as plugged honeycomb bodies 100P for particulate filters (DPF and GPF applications), while providing adequate overall strength and thermal shock resistance (TSR).

In addition to the relatively high average bulk porosity % P, the porous ceramic body 100 of the present disclosure can also comprise a relatively narrow pore size distribution. The narrow pore size distribution can be evidenced by a minimized percentage of relatively fine pore sizes or relatively large pore sizes, or minimized percentage of both relatively fine and relatively large pore sizes in some embodiments. Such narrow pore size distribution has the advantage of providing relatively lower back pressure even when coated with a catalyst-containing washcoat, such as a TWC or SCR catalyst. Further, narrow pore size distribution can be beneficial for providing low soot-loaded pressure drop as well as excellent soot capture efficiency when the ceramic body 100 is utilized in diesel (DPF) and or gasoline engine exhaust filtration (GPF) applications.

To this end, relative pore size distributions are determined by mercury intrusion porosimetry using the Washburn equation. For example, the quantity $d_{50}$ represents the median pore diameter based upon pore volume (measured in micrometers). Thus, $d_{50}$ is the median pore diameter at which 50% of the open porosity of the porous ceramic body 100 has been intruded by mercury. The quantity $d_{90}$ is the pore diameter at which 90% of the pore volume is comprised of pores whose diameters are smaller than the value of $d_{90}$; thus, $d_{90}$ is also equal to the pore diameter at which 10% by volume of the open porosity of the porous ceramic body has been intruded by mercury. Still further, the quantity do is the pore diameter at which 10% of the pore volume is comprised of pores whose diameters are smaller than the value of $d_{10}$; thus, $d_{10}$ is equal to the pore diameter at which 90% by volume of the open porosity of the porous ceramic body has been intruded by mercury. The values of $d_{10}$ and $d_{90}$ are also expressed in units of micrometers.

$d_{50}$

In accordance with an aspect of the disclosure, the porous walls 102 of the porous ceramic body 100, after firing, can comprise a median pore diameter ($d_{50}$) of $d_{50}$≥8.0 μm, $d_{50}$≥10.0 μm, $d_{50}$≥12.0 μm, $d_{50}$≥14.0 μm, $d_{50}$≥16.0 μm, or even $d_{50}$≥18.0 μm in some embodiments. Further, the porous walls 102 of the porous ceramic body 100, after firing, can comprise a median pore diameter ($d_{50}$) that ranges as follows: 8 μm≤$d_{50}$≤22 μm, 10 μm≤$d_{50}$≤20 μm, and even 12 μm≤$d_{50}$≤17 μm in some embodiments.

$d_f$

The narrowness of the lower pore fraction (equal to and below $d_{50}$) of the pore size distribution of the open, interconnected porosity of the porous ceramic body 100 can be characterized as comprising a d factor ($d_f$), wherein $d_f$=($d_{50}$−$d_{10}$)/$d_{50}$. In example embodiments of the ceramic body 100, $d_f$ can be $d_f \leq 0.50$, $d_f \leq 0.40$, $d_f \leq 0.35$, $d_f \leq 0.30$, and even $d_f \leq 0.25$ in some embodiments.

Exceedingly narrow pore size distribution embodiments of the non-stoichiometric cordierite-containing porous ceramic body 100 can have d factor of $d_f \leq 0.24$, or even $d_f \leq 0.22$. In some embodiments, the porous walls 102 of the porous ceramic body 100, after firing, can comprise $d_f$ of $0.20 \leq d_f \leq 0.50$; $0.20 \leq d_f \leq 0.30$, $0.20 \leq d_f \leq 0.25$, or even $0.20 \leq d_f \leq 0.22$ in some embodiments.

$d_b$

A relative measure of narrowness of a broader pore fraction of the pore size distribution (from $d_{10}$ to $d_{90}$) can be characterized by the parameter d breadth ($d_b$) of the pore size distribution of the open, interconnected porosity of the porous ceramic body 100. For example, $d_b$ of the pore size distribution of the open, interconnected porosity of the porous ceramic body 100 may be $d_{b\ \leq 1.20}$, $d_b \leq 1.00$, $d_b \leq 0.90$, wherein $d_b = [(d_{90} - d_{10})/d_{50}]$. Exceedingly narrow pore size distribution embodiments of the non-stoichiometric cordierite-containing porous ceramic body 100 can have $d_b \leq 0.80$, or even $d_b \leq 0.70$. In some embodiments, the porous walls 102 of the porous ceramic body 100, after firing, can comprise $d_b$ of $0.58 \leq d_b \leq 1.20$; $0.58 \leq d_b \leq 1.00$, $0.58 \leq d_b \leq 0.90$, $0.58 \leq dB \leq 0.80$, or even $0.58 \leq dB \leq 0.70$ in some embodiments.

CTE

The coefficient of thermal expansion (CTE) of the porous ceramic body 100 comprising the non-stoichiometric ceramic material was discovered to be quite low. According to example embodiments, it was discovered that the present non-stoichiometric cordierite-containing ceramic material exhibits a low coefficient of thermal expansion resulting in excellent thermal shock resistance (TSR), As will be appreciated by one of ordinary skill in the art, TSR is inversely proportional to the coefficient of thermal expansion (CTE). That is, a porous ceramic body 100 with low thermal expansion can also have higher TSR and may therefore survive relatively wide temperature fluctuations that are encountered in, for example, diesel and gasoline exhaust filtration applications (e,g., in DPP and GPF applications).

Accordingly, in example embodiments, the porous ceramic body 100 of the present disclosure comprising the ceramic phase composition comprising cordierite and indialite, as described herein for example, can exhibit a relatively-low coefficient of thermal expansion (CTE) in at least one direction, as measured by dilatometry, In particular, CTE can comprise CTE≤$15 \times 10^{-7}$/° C., CTE≤$12 \times 10^{\leq 7}$/° C., CTE≤$10 \times 10^{-7}$/° C., CTE≤$8 \times 10^{-7}$/° in some embodiments, all as measured across the temperature range of from 25° C. to 800° C. Some embodiments of the non-stoichiometric cordierite-containing porous ceramic body 100 can exhibit very low CTE, such as CTE≤$6 \times 10^{-7}$/° C., or even CTE≤$5 \times 10^{-7}$/° C., all as measured across the temperature range of from 25° C. to 800° C. In some embodiments, the CTE across the temperature range of from 25° C. to 800° C. can range from $4 \times 10^{-7}$/° C.≤CTE≤$15 \times 10^{-7}$/° C.; $4 \times 10^{-7}$/° C.≤CTE≤$10 \times 10^{-7}$/° C.; $4 \times 10^{-7}$/° C.≤CTEV≤$8 \times 10^{-7}$/° C. or even $4 \times 10^{-7}$/° C.≤CTE≤$6 \times 10^{-7}$/° C.

The porous ceramic body 100 can be further characterized as a microcracked body comprising microcracks. The level of microcracking can be characterized by a microcrack index $nb^3$. One or more embodiments of the porous ceramic body 100 can comprise a microcrack index $nb^3 \geq 0.10$. In some further embodiments, the microcrack index $nb^3$ can be $nb^3 \leq 0.20$, $nb^3 \leq 0.30$, or even $nb^3 \leq 0.40$. The microcrack index $nb^3$ can range $0.10 \leq nb^3 \leq 0.43$, $0.20 \leq nb^3 \leq 0.43$, or even $0.30 \leq nb^3 \leq 0.43$ in some highly microcracked embodiments.

Combinations

Porous ceramic bodies 100 with combinations of the aforementioned relatively high average bulk porosity (% P), relatively high median pore diameter (d50), relatively low $d_f$, and/or relatively low $d_b$, and relatively low CTE (25 ° C. to 800° C.) can provide low clean and soot-loaded pressure drop, while maintaining useful filtration efficiency and TSR enabling the porous ceramic body 100 of the present disclosure to be effectively used in exhaust filtration applications, and especially in GPF applications, Particularly effective examples of the porous ceramic bodies 100 can comprise the ceramic composition containing non-stoichiometric cordierite, such as described herein, and can further comprise average bulk porosity (% P) of the porous walls 102 of P %≥55%, a median pore size ($d_{50}$) of $d_{50} \geq 9.0$ μm wherein $d_{50}$ is a median pore diameter of the porous ceramic body 100, $d_f \leq 0.40$ wherein $d_f = ((d_{50} - d_{10})/d_{50})$, and CTE≤$13 \times 10^{-7}$/° C. as measured from 25 ° C. to 800° C. In some embodiments, the porous ceramic body 100 can comprise a ceramic composition material containing non-stoichiometric cordierite, such as described herein, and can further comprise average bulk porosity (% P) of the porous walls 102 of 55%≤P %≤72%, a median pore size ($d_{50}$) of 8.0 μm≤$d_{50}$≤22.0 μm, $0.20 \leq d_f \leq 0.50$, and $4 \times 10^{-7}$/° C.≤CTE≤$14 \times 10^{-7}$/° C., as measured from 25 ° C. to 800° C.

Certain other example embodiments of the disclosure can comprise a ceramic composition containing non-stoichiometric cordierite, such as described herein, and can further achieve % P≤60%; $d_{50} \geq 10$ μm; $d_f \leq 0.25$; and CTE≤$10 \times 10^{-7}$/° C., as measured between 25° C. and 800° C. Moreover, certain other example, embodiments for high porosity applications can achieve % P≥65%; $d_{50} \geq 12$ μm; $d_f \leq 0.22$; and CTE≤$10 \times 10^{-7}$/° C., as measured between 25° C. and 800° C.

As briefly summarized above, example embodiments of the present disclosure provide a porous ceramic body 100 comprising a ceramic composite material containing a predominant crystalline phase made up of a combination of non-stoichiometric cordierite and indialite. In particular, the ceramic body 100 comprises at least 85 wt % of combined crystalline phases containing cordierite and indialite, and may contain other phases such as spinel, sapphirine, enstatite, mullite, cristabolite, and an amorphous phase. Other crystalline phases may be present.

Composition

In more detail, in some embodiments, the porous ceramic body 100 can comprise a predominant crystalline phase of non-stoichiometric cordierite and a composition that contains a dopant, such as from 0.1 wt % to 5.0 wt % $P_2O_5$ based on the total amount of inorganics present. In some embodiments, the composition can contain from 1.0 wt % to 3.0 wt % $P_2O_5$ based on the total amount of inorganics present. In yet further embodiments, the composition can contain from 1.0 wt % to 2.0 wt % $P_2O_5$ based on the total amount of inorganics present in the porous ceramic body 100.

Figure 3:
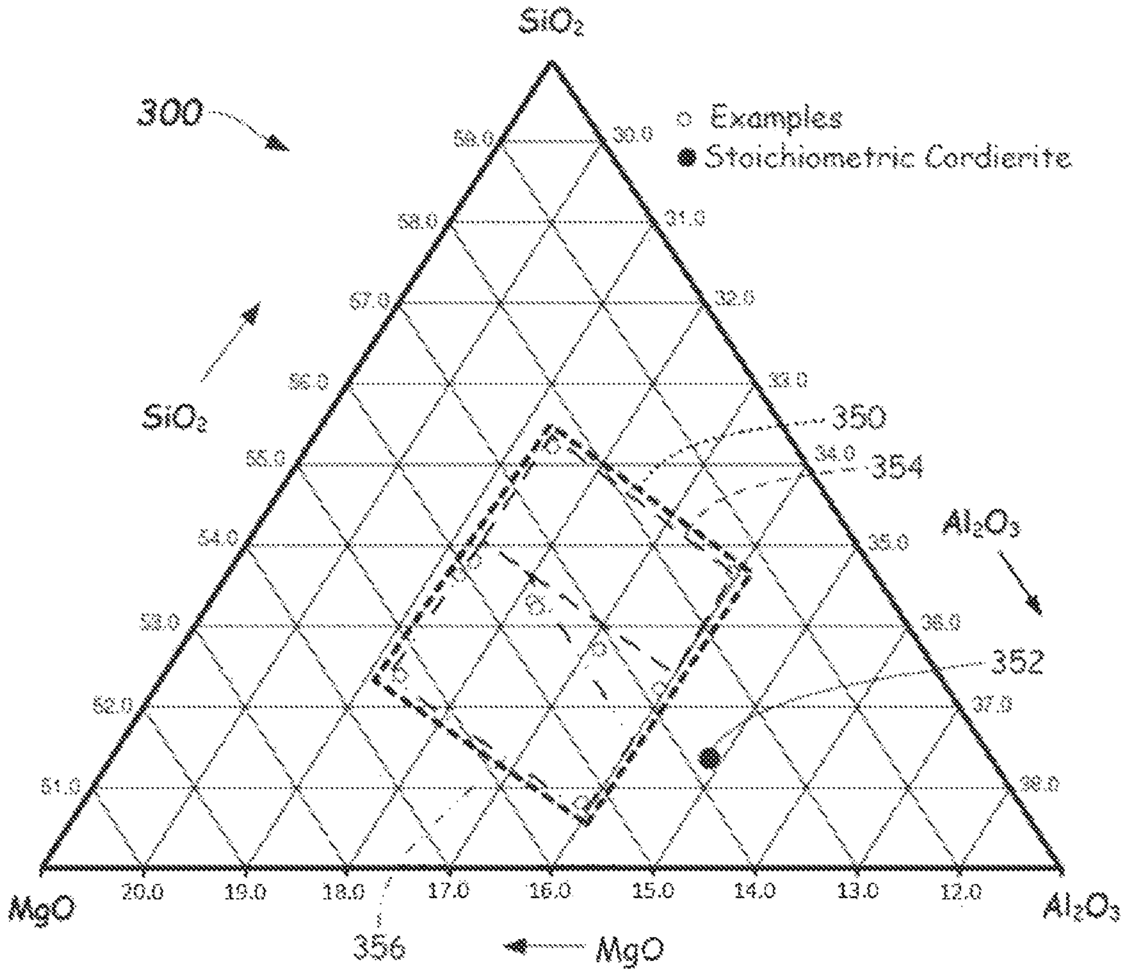
FIG. 3 illustrates a ternary plot of relative oxide weight ratios of $MgO:Al_2O_3:SiO_2$ within the field (based on MgO, $Al_2O_3$, and $SiO_2$ totaling to 100%) according to one or more embodiments of the disclosure.

The composition, as is shown in the ternary diagram 300 of FIG. 3, comprises, as expressed on a relative oxide weight basis, MgO, $Al_2O_3$, and $SiO_2$. The composition is defined herein on the ternary diagram 300 using a "relative" oxide weight percent basis in terms of MgO, $Al_2O_3$, and $SiO_2$ that resides within a field 350 of the ternary diagram 300 having corner boundaries (corner points) defined by (15.4, 34.1, and 50.5), (12.2, 34.1, and 53.7), (13.3, 31.2, and 55.5), and (16.6, 31.1, and 52.3), and straight lines between the corner points, which can comprise a generally rectangular or slightly rhomboidal field shape. This field 350 is considered outside of the compositional range that is stoichiometric cordierite, wherein stoichiometric cordierite is shown in FIG. 3 as point 352 on the ternary diagram 300. As should be understood, the "relative" oxide weight percent of each of MgO, $Al_2O_3$, and $SiO_2$ for any point in the field 350 sum to 100%. The term "relative" meaning only relative to each other in the group of MgO, $Al_2O_3$, and $SiO_2$. The composition may comprise other oxides, expressed in oxide weight percent, such as $P_2O_5$, but based on the total weight of inorganics present. Then, the oxide weights of MgO, $Al_2O_3$, and $SiO_2$, and any other oxides in the composition, such as $P_2O_5$, also add up to 100%.

In some embodiments, the composition can be defined on a "relative" oxide weight percent basis in terms of MgO, $Al_2O_3$, and $SiO_2$ that resides within a first subfield 354 of the ternary diagram 300, which is a subfield of field 350. The corner boundaries (corner points) of the first subfield 354 are defined by (13.5, 34.1, and 52.4), (12.2, 34.1, and 53.7), (13.3, 31.2, and 55.5) and (14.7, 31.2, and 54.2). First subfield 354 can comprise a generally rectangular field shape comprising higher concentrations of alumina and silica on a relative oxide weight basis. Compositions in this first subfield 354 can comprise CTE below $10\times10^{-7}$/° C. (25° C. to 800° C.) and $d_f$<0.25.

In some embodiments, the composition can be further defined on a "relative" oxide weight percent basis in terms of MgO, $Al_2O_3$, and $SiO_2$ that resides within a second subfield 356 of the ternary diagram 300, which is a subfield of field 350, wherein the second subfield 356 comprises corner boundaries (corner points) defined by (15.4, 34.1, and 50.5), (14.3, 34.1, and 51.6), (14.5, 31.7, and 53.9), (14.7, 31.2, and 54.2), and (16.6, 31.1, and 52.3). Second subfield 356 can comprise a generally five-sided (irregular pentagon) shape comprising lower concentrations of alumina and silica on a relative oxide weight basis. Compositions in this second subfield 356 can comprise even lower CTE at a given $d_f$.

The weight percentages expressed herein as well as identification of the various phases that are present is accomplished by the Reitveld refinement method, and are expressed as a percentage of 100 wt % of the total weight of the inorganics present in the ceramic body 100, except that the relative oxide weight percentages are expressed only as a percentage of 100% of the total of MgO, $Al_2O_3$, and $SiO_2$ that is present.

Figure 4B:
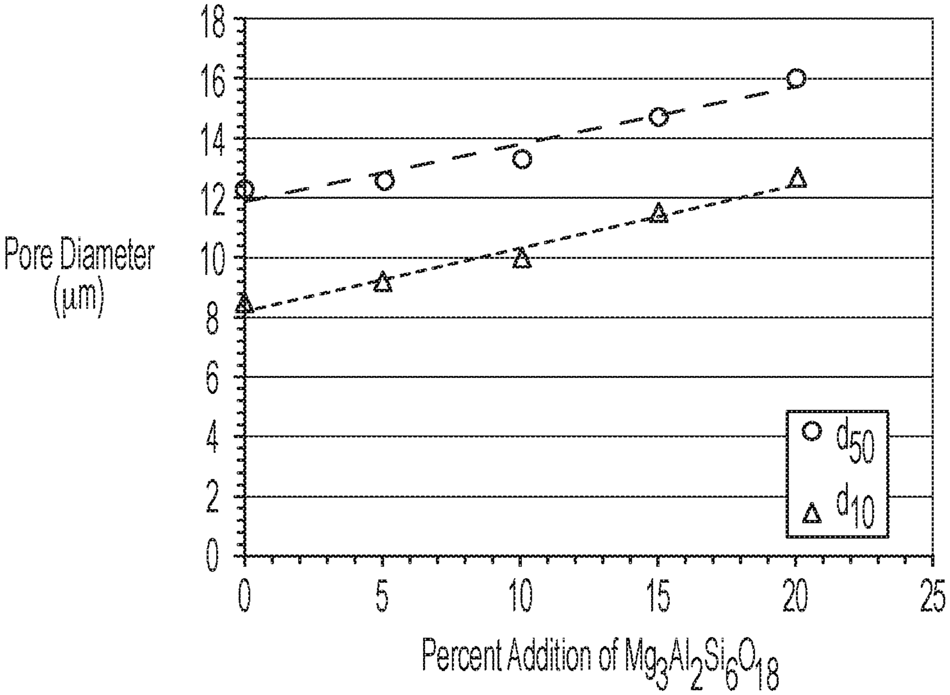
FIG. 4B illustrates a plot of pore diameter ($d_{50}$ and $d_{10}$) versus percent addition of the dopant $Mg_3Al_2Si_6O_{18}$ according to one or more embodiments of the disclosure.
Figure 4C:
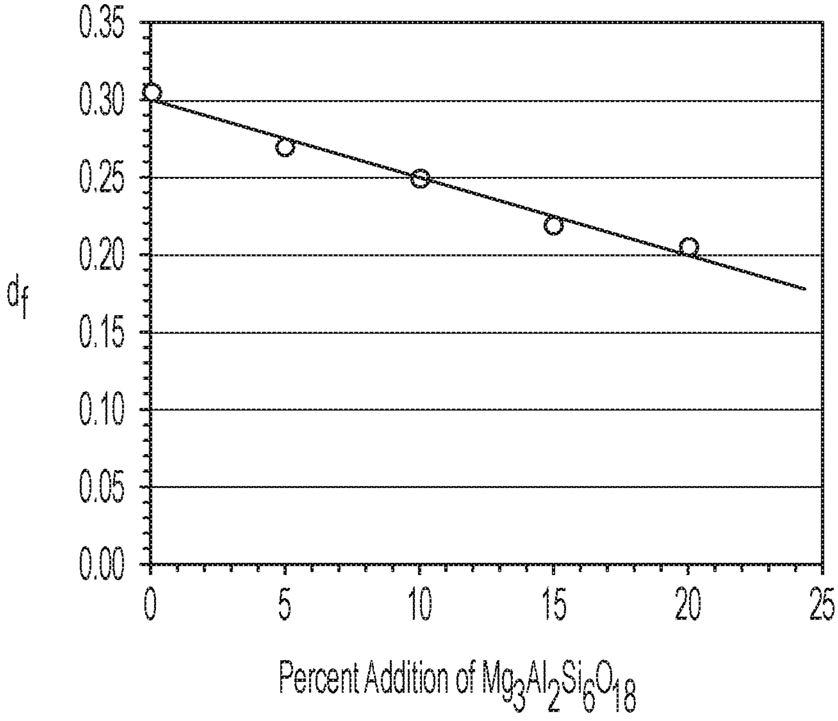
FIG. 4C illustrates a plot of $d_f$ versus percent addition of the dopant $Mg_3Al_2Si_6O_{18}$ according to one or more embodiments of the disclosure.
Figure 4D:
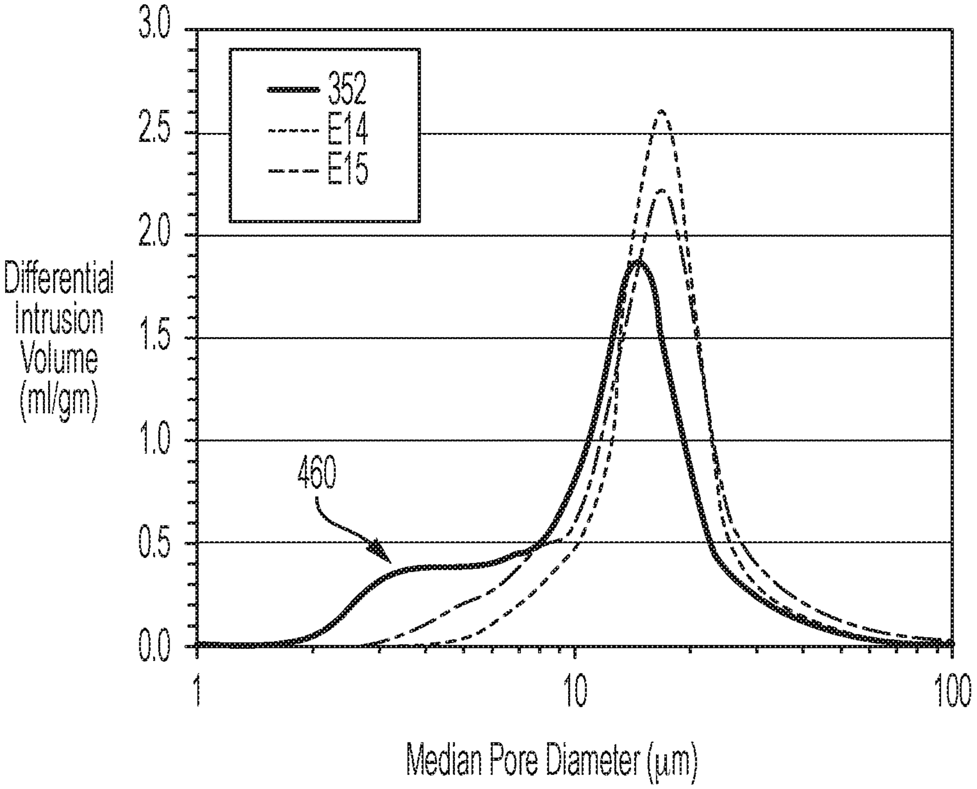
FIG. 4D illustrates a plot of differential intrusion volume (ml/gm) versus median pore diameter illustrating the reduction of small pore fraction and relatively higher median pore diameter when comparing stoichiometric cordierite to several examples of the disclosure.

The porous ceramic body 100 can further comprise a dopant provided on an aggregate oxide basis from 5 wt % to 24 wt % of $Mg_3Al_2Si_6O_{18}$. As can be seen by FIGS. 4B and 4C, the addition of $Mg_3Al_2Si_6O_{18}$ as a dopant can appreciably increase the median pore size $d_{50}$ and also $d_{10}$ (FIG. 4A) and can reduce $d_f$ (FIG. 4C), both very desirable attributes for particulate filters. FIG. 4D illustrates a plot of differential intrusion volume (ml/gm) versus median pore diameter (μm). This plot illustrates that, as compared to stoichiometric cordierite 352, some embodiments (e.g., E14 and E15) result in narrower overall pore size distribution (e.g., lower $d_b$), and specifically the low fraction of small pores (below $d_{50}$) of stoichiometric cordierite 352 can be dramatically reduced. For example, the low fraction anomaly 460 of stoichiometric cordierite shown in FIG. 4D resulting in the bi-modal shape shown can be substantially reduced in embodiments comprising the non-stoichiometric cordierite according to the disclosure. For example, E14 and E15 are doped with 20 wt % of $Mg_3Al_2Si_6O_{18}$ and 3.8% $Mg_3Al_5P_3O_{18}$, respectively. In terms of mechanism, it is believed that a larger amount of liquid phase is formed during the soak phase of the firing cycle as a result of this dopant addition and that liquid migrates, due to capillary forces, to fill the finer pores. Thus, consequentially a narrower pore size distribution results, yet without any appreciable loss of porosity. For example, an addition of 3.8 wt % $Mg_3Al_5P_3O_{18}$ can result in approximately 28% reduction in $d_f$. An addition of 20 wt % $Mg_3Al_2Si_6O_{18}$ can result in approximately 44% reduction in $d_f$. Equivalent % P can be substantially retained or only slightly lowered as compared to stoichiometric cordierite. Thus, the composition of the porous ceramic body 100, on an aggregate oxide basis, can comprise from 85 wt % to 95 wt % of cordierite and indialite phase material that itself is comprised of 5 wt % to 24 wt % of dissolved $Mg_3Al_2Si_6O_{18}$ or 1 to 9 wt % of dissolved $Mg_3Al_5P_3O_{18}$ on an oxide basis. Other phosphorous containing solid solutions may be optionally or additionally present.

In other embodiments, the dopant can be phosphorous oxide ($P_2O_5$). Phosphorous oxide ($P_2O_5$). Phosphorous oxide ($P_2O_5$) can be added to the batch composition in the amounts specified herein and can be present in solid solution in the porous ceramic body 100 as $Mg_3Al_5P_3O_{18}$, $Mg_2Al_5Si_3PO_{18}$, $Mg_3Al_3Si_4PO_{18}$, or any combination thereof in $Mg_2Al_4Si_5O_{18}$. Phosphorous oxide ($P_2O_5$) can be provided in 0.1 wt % to 5 wt % based upon the total weight of inorganics present in the batch. And the porous ceramic body 100 can comprise a composition, for example, on an aggregate oxide basis, of 1 wt % to 9wt % $Mg_3Al_5P_3O_{18}$, 1 wt % to 14 wt % $Mg_2Al_5Si_3PO_{18}$, 1 wt % to 8 wt % $Mg_3Al_3Si_4PO_{18}$, or any combination of the afore-mentioned, and 85 wt % to 99 wt % $Mg_2Al_4Si_5O_{18}$.

i-Ratio

According to example embodiments of the disclosure, the porous ceramic bodies 100 demonstrate a preferred crystallographic texture of the cordierite phase that can be defined by an axial I-ratio and transverse I-ratio. The axial i-ratio and the transverse i-ratio are defined as the Rietveld-deconvoluted peak intensities of the indicated diffraction peaks. For the axial i-ratio, X-ray Diffraction (XRD) peak intensities were measured perpendicular to the porous wall 102 of the porous ceramic body 100. For the transverse i-ratio, XRD peak intensities were measured on a wall surface or slightly polished honeycomb wall surface. Rietveld deconvolution can be used to extract the cordierite peak intensities from contributions of overlapping peaks of the other phases present. In the exemplary embodiments of the disclosure, the cordierite phase of the ceramic bodies comprises axial i-ratios of 0.40-0.63 and transverse i-ratios of 0.78-0.90. In some embodiments, axial i-ratios can be less than or equal to 0.50 or even less than or equal to 0.45.

Extrusion Methods

Example embodiments of the present disclosure also provide methods of manufacturing a cordierite and indialite containing ceramic bodies from a batch composition mixture comprising certain inorganic powdered raw materials, powdered organic materials including a pore former, a liquid vehicle (e.g., water), and one or more processing aids. The method comprises providing an inorganic batch composition mixture comprising inorganic source materials, such as sources of magnesia, sources of alumina, sources of silica, and possibly phosphorous oxide. The sources can comprise selected particle sizes and distributions (e.g., $dp_{50}$ and $dp_b$) and weight percentages (wt %) as outlined herein. The inorganic batch composition powders can then be mixed and/or mulled together with the organic powdered materials such as an organic binder, the pore former; the liquid vehicle; and one or more processing aid(s) selected from the group consisting of a plasticizer and lubricant, to form a plasticized batch composition mixture 210. The plasticized batch composition mixture 210 can be shaped or otherwise formed into a green body 100G (See FIG. 2), such as a honeycomb green body. The green body 100G can then be dried and subsequently fired under conditions effective to convert the green body 100G into a porous ceramic body 100 comprising the afore-mentioned cordierite-indialite crystalline composition containing the properties described herein.

Figure 2:
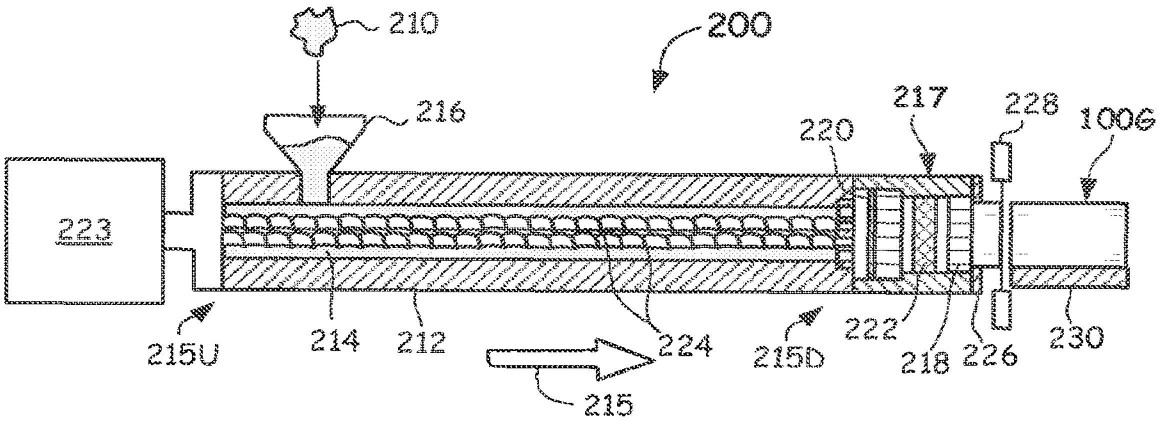
FIG. 2 illustrates a partially cross-sectioned side view of an extruder shown extruding a green honeycomb body according to one or more embodiments of the disclosure.

For example, the plasticized batch composition can be formed into the green body 100G by an extrusion method. For example, FIG. 2 illustrates a cross-sectioned side view of an example embodiment of an extruder 200 (e.g., a continuous twin-screw extruder). The extruder 200 comprises a barrel 212 comprising a chamber 214 formed therein. The barrel 212 can be monolithic or it can be formed from a plurality of barrel segments connected successively in the longitudinal direction 215 (e.g., direction indicated by arrow). The chamber 214 extends through the barrel 212 in the longitudinal direction 215 between an upstream side 215U and a downstream side 215D. At the upstream side 215U of the barrel 212, a material supply port 216, which can comprise a hopper or other material supply structure, may be provided for supplying a batch composition mixture 210 to the extruder 200. A cartridge assembly 217 comprising a honeycomb extrusion die 218 can be provided at the downstream side 215D for extruding the batch mixture 210 into a desired shape, such as the green body 100G. The honeycomb extrusion die 218 can be preceded by other structures, such as a generally open cavity, screen 220, homogenizer 222, and the like to facilitate the formation of a steady plug-type flow front before the plasticized batch composition mixture 210 reaches the honeycomb extrusion die 218.

As further shown in FIG. 2, a pair of extruder screws 224 can be rotatably mounted in the barrel 212. The screws 224 may be arranged generally parallel to each other, as shown, though they may optionally be arranged at various angles relative to each other. The screws 224 may also be coupled to a driving mechanism 223 located outside of the barrel 212 for rotation of the screws 224 in the same or different directions. It is to be understood that both the screws 224 may be coupled to a single driving mechanism 223, as shown, or to individual driving mechanisms (not shown). The screws 224 operate to move the batch composition mixture 210 through the chamber 214 with pumping and further mixing action in the longitudinal direction 215. Further supporting structure may be provided to support the screws 224 at their ends and/or along their length. Such supporting structure may comprise perforations or holes therein to allow the batch composition mixture 210 to flow there through.

FIG. 2 additionally illustrates the extruder 200 with the green body 100G being extruded therefrom. An extruder cartridge 217 may comprise extrusion hardware such as the honeycomb extrusion die 218 and a skin forming mask 226. The green body 100G is extruded from the extruder 200, and in some embodiments the skin 106 surrounding the matrix of plurality of walls 102 is also formed during extrusion along with the plurality of walls 102 and is knitted thereto. The honeycomb body 100G can then be cut to length with a cutting element 228, and can be provided on a tray 230. The tray 230 can be as described in U.S. Pat. Nos. 9,440,373; 9,085,089; 8,407,915, for example.

Cutting can be achieved by wire cutting, saw cutting, such as with a band saw or reciprocating saw, or other cutting method. The tray 232 can be provided to a dryer, such as described in U.S. pat. Nos. 9,335,093, 9,038,284, 7,596,885, and 6,259,078, for example.

Any suitable drying method can be used, such as RF drying, microwave drying, oven drying, or combinations thereof. In some embodiments, the green body 100G can be cut from a log from which multiple honeycomb bodies are provided, such as after drying. After drying, the green body 100G can be fired under conditions effective to convert the green body 100G into a porous ceramic body 100 comprising a cordierite, indialite, and other usually some secondary crystalline phases. Firing cycles providing conditions effective to produce the porous ceramic body 100 comprising a cordierite, indialite can include peak soak temperature of between 1340° C. and 1425° C. for about 5 to about 20 hours or more depending on the composition used and part size.

Batch Composition

In accordance with another aspect, a batch composition can be provided from which the porous ceramic body 100 comprising a cordierite and indialite is formed. The batch composition mixture can comprise inorganic raw material ingredients comprising a magnesia source, an alumina source, a silica source, optionally a phosphorous source, and a pore former (e.g., a starch and/or graphite). Suitable particles sizes ($dp_{10}$, $dp_{50}$, $dp_{90}$), particle size distribution ($dp_f$) , and particle distribution breadth ($dp_b$) can be as described in Table 1 below.

TABLE 1

Example Raw Batch Materials and Particle Sizes & Distributions

| | Particle Sizes (μm) | | | (unit less) | |
|---|---|---|---|---|---|
| Raw Materials | $dp_{10}$ | $dp_{50}$ | $dp_{90}$ | $dp_f$ | $dp_b$ |
| Talc A | 3.14 | 7.12 | 14.07 | 0.56 | 1.54 |
| Talc B | 4.92 | 15.13 | 36.53 | 0.67 | 2.09 |
| Talc C | 9.41 | 20.99 | 40.54 | 0.55 | 1.48 |
| Magnesium hydroxide | 0.99 | 3.24 | 9.52 | 0.69 | 2.63 |
| Alumina 1 | 3.26 | 6.58 | 19.72 | 0.50 | 2.50 |
| Alumina 2 | 0.37 | 0.65 | 1.88 | 0.43 | 2.32 |
| Alumina 3 | 1.20 | 3.40 | 6.20 | 0.65 | 1.47 |
| Aluminum hydrate - $Al(OH)_3$ | 1.80 | 5.22 | 10.77 | 0.66 | 1.72 |
| Aluminum monohydrate | 0.09 | 0.12 | 0.25 | 0.25 | 1.33 |
| Silica 1 | 0.96 | 5.14 | 16.78 | 0.81 | 3.08 |
| Silica 2 | 0.35 | 1.30 | 7.33 | 0.73 | 5.35 |
| Clay 1 | 2.71 | 8.23 | 18.59 | 0.67 | 1.93 |
| Aluminum metaphosphate | 4.79 | 15.26 | 40.23 | 0.69 | 2.32 |
| XL Corn Starch | 10.74 | 15.38 | 22.96 | 0.30 | 0.79 |
| XL Pea Starch | 17.71 | 25.59 | 38.75 | 0.31 | 0.82 |
| XL Potato Starch | 28.92 | 47.82 | 76.11 | 0.40 | 0.99 |
| Graphite | 3.03 | 8.01 | 16.63 | 0.62 | 1.70 |

To this end, as referred to herein, all particle sizes are measured by a laser diffraction technique and a Microtrac particle size analyzer with the exception of the dispersible alumina (aluminum monohydrate—AlOOH) wherein the properties were defined by the supplier.

Magnesia Source

For example, the magnesia source can, for example and without limitation, be any suitable compound able to provide an oxide of magnesium useful in forming the cordierite-indialite crystalline phase composition. For example, the magnesia source can be selected as a talc source, or magnesium hydroxide, or combinations thereof. For example, the talc source can be calcined or un-calcined talc. Optionally, the magnesia source can be one or more of MgO, $Mg(OH)_2$, $MgCO_3$, $MgAl_2O_4$, $Mg_2SiO_4$, and $MgSiO_3$. Alternatively, the magnesia source can be selected from one or more of forsterite, olivine, chlorite, or serpentine. The magnesia source, when a talc, can have a median particle diameter ($dp_{50}$) in a range from about 6 μm to about 25 μm and can have $dp_b \leq 2.2$, wherein $dp_b$ is the particle breadth factor and is $(dp_{90}-dp_{10})/dp_{50}$. The magnesia source can comprise a relative weight percentage of from about 12 wt % to 17 wt % based on 100% of the total weight of the magnesia, alumina, and silica inorganics present in the batch composition mixture 210.

Alumina Source

The alumina source can, for example and without limitation, be any suitable compound able to provide an oxide of aluminum useful in forming the cordierite-indialite crystalline composition. The alumina source can be, for example, selected from an alumina-forming source such as calcined alumina (alpha alumina), corundum, an aluminum hydrate (or hydrated alumina) such as $Al(OH)_3$, a dispersible alumina such as boehmite (AlOOH) that is capable of forming a colloidal suspension, diaspore, or a transition alumina such as gamma-alumina or rho-alumina. Alternatively, the alumina source can be a compound of aluminum with another metal oxide or element such as $MgAl_2O_4$, mullite, clay such as kaolin or calcined kaolin, halloysite clay ($Al_2Si_2O_5(OH)_4$), attapulgite clay ($(Mg,Al)_2Si_4O_{10}(OH)\,4(H_2O)$)), pyrophyllite ($Al_2Si_4O_{10}(OH)_2$), kyanite ($Al_2SiO_5$), aluminum chlorite ($Al(ClO_2)_3$, and the like.

In some embodiments, the median particle diameter ($dp_{50}$) of the alumina source can be less than or equal to about 7.0 μm, and can be in the range from about 0.5 μm to about 7.0 μm, for example. The alumina source can comprise a relative oxide weight percentage of from about 31 wt % to 34 wt % based on 100% of the total weight of the magnesia, alumina, and silica inorganics present in the batch composition mixture 210. In some embodiments, the alumina source can comprise a combination of alumina in from 17 wt % to 22 wt %; and hydrated alumina in a range from 14 wt % to 18 wt %, each based on the total weight of inorganics in the batch composition mixture.

Silica Source

The silica source can, for example and without limitation, be any suitable compound able to provide an oxide of silica useful in forming the cordierite-indialite crystalline composition. The silica source can, for example, be selected from a silica source such as a $SiO_2$ powder such as quartz, cryptocrystalline quartz, fused silica, diatomaceous silica, low-alkali zeolite, colloidal silica, and combinations thereof. Additionally, the silica source can also be provided as a compound with magnesium and/or aluminum, including for example, talc, ground or particulate cordierite, kaolin clay, phyrophyllite ($Al_2Si_4O_{10}(OH)_2$), kyanite ($Al_2SiO_5$), and the like. In embodiments, the median particle size ($dp_{50}$) of the silica source can range from about 0.5 μm to about 6 μm. The silica source can comprise relative oxide weight percent of from about 52 wt % to 56 wt % based on 100% of the total weight of the magnesia, alumina, and silica inorganics present in the batch composition mixture 210.

Phosphorous source

The phosphorous oxide source can, for example and without limitation, be any suitable compound able to provide phosphorous oxide. The phosphorous oxide source can for example be selected from aluminum metaphosphate ($Al(PO_3)_3$, aluminum phosphate also referred to as berlinite, aluminum phosphate dihydrage also referred to as variscite, any of the magnesium phosphates like trimagnesium phosphate or hydrates of the magnesium phosphates. Phosphorous oxide powders having the median particle sizes ($d_{50}$) and/or the particle size distributions shown in Table 1 can be used. For example, the phosphorus oxide source can have a median particle size of from about 10 μm to 20 μm, for example. Further, the phosphorus oxide source can have a particle size distribution comprising a breadth factor $dp_b \leq 2.5$, wherein $dp_b=(dp_{90}-dp_{10})/dp_{50}$.

Pore Former

In order to achieve the relatively high average bulk porosity (% P≥50%) the batch composition mixture 210 can contain a pore-former to aid in tailoring the average bulk porosity and possibly the pore size distribution of the porous ceramic body 100. A pore former is a fugitive material, which evaporates or undergoes vaporization by combustion during drying and/or heating of the green body 100G to obtain a desired high average bulk porosity, which can further comprise a desired coarse median pore diameter ($d_{50}$) in the porous ceramic body 100. A suitable pore former can comprise, without limitation, carbon; graphite; starch; wood, shell, or nut flour; polymers such as polyethylene beads; and the like, and combinations of the aforementioned. Starches can comprise corn starch, pea starch, rice starch, sago starch, potato starch, and the like. Starches can be cross-linked (XL starches). When certain pore formers are used, such as potato starch, combinations of relatively coarser (larger dp50) talc, alumina, and/or silica sources can be utilized to lower df.

Example embodiments that aid in providing useful combinations of relatively high porosity and relatively large $d_{50}$in the porous ceramic body 100 can comprise combinations of starch and graphite. For example, the pore former can comprise XL pea starch alone or in combination with graphite, or XL corn starch alone or in combination with graphite. The pore former can be provided in the batch composition mixture 210 in an amount from about 24 wt % $SA_{pf}$ to about 58 wt % $SA_{pf}$, or even from about 27 wt % $SA_{pf}$ to about 55 wt % $SA_{pf}$, based upon superaddition (SA) to 100% of the total weight of the inorganics present in the batch composition mixture 210. Embodiments including combinations of XL starch of between 20 wt % $SA_{pf}$ to about 47 wt % $SA_{pf}$ and graphite of between 5 wt % $SA_{pf}$ to about 15 wt % $SA_{pf}$ based upon 100% of the weight of the inorganics present in the batch composition mixture 210 can provide excellent combinations of high average bulk porosity % P and median pore diameter ($d_{50}$) useful for filtration applications. Combinations of XL pea starch and XL corn starch with graphite can be particularly effective. The amount of pore former is computed as the $w_i \times$wt % SA/100, wherein $w_i$ is the total weight of inorganic raw materials.

The starch can have a median particle diameter ($dp_{50}$) in the range from about 10 μm to 50 μm, and from about 15 μm to 30 μm in other embodiments. The graphite can have a median particle diameter ($dp_{50}$) in the range from about 5 μm to 10 μm in some embodiments.

Organic Binder

The batch composition mixture 210 may comprise an organic binder. The organic binder may be, for example, a cellulose-containing binder. In some embodiments, the cellulose-containing binder may be, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, mixtures thereof, and the like. Methylcellulose and/or methylcellulose derivatives are especially suited as organic binders for use in the batch composition mixture 210, with methylcellulose and hydroxypropyl methylcellulose being excellent choices. Sources of cellulose ethers are METHOCEL™ cellulose products available from DOW® CHEMICAL CO.

Some embodiments of the batch composition mixture 210, such as those disclosed in Tables 2A-2E below, may comprise hydroxypropyl methylcellulose. Other combinations of cellulose ether binders may comprise cellulose ethers having different molecular weights. Alternatively, the combination of cellulose ethers may comprise cellulose ethers having different hydrophobic groups, different concentrations of the same hydrophobic group, or other cellulose ether combinations. Different hydrophobic groups may be, by way of non-limiting example, hydroxyethyl or hydroxypropyl. The organic binder, in some embodiments, may be a combination of a hydroxyethyl methylcellulose binder and a hydroxypropyl methylcellulose binder. Other suitable combinations of organic binders may be used.

The organic binder may be provided in the batch composition in an amount of about 2.0 wt % by SA to 8.0 wt % SA, or even about 3.0 wt % SA to about 6.0 wt % SA, wherein SA is based on a superaddition to 100% of the total weight of the inorganics and pore formers that are present in the batch composition mixture 210.

Processing Aids

Still further, the batch composition mixture 210 can comprise other processing aids such as plasticizers, surfactants, and/or oil lubricants. Non-limiting examples of surfactants that can be used as a processing aids are $C_8$ to $C_{22}$ fatty acids, and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, and palm itic acids, and their derivatives, tall oil, stearic acid in combination with ammonium lauryl sulfate, and combinations of all of these. In an illustrative embodiment, the surfactant is lauric acid, stearic acid, oleic acid, tall oil, or combinations of the aforementioned. In some embodiments, the amount of processing aid can range from about 0.25 wt % SA to about 2 wt % SA, and from about 0.5 wt % SA to 1.5 wt % SA in the depicted embodiments.

Non-limiting examples of oil lubricants that could be used as forming aids can comprise light mineral oil, corn oil, high molecular weight polybutenes, polyol esters, a blend of light mineral oil and wax emulsion, a blend of paraffin wax in corn oil, or combinations of these and olefins. In some embodiments, the amount of oil lubricants can be from about 0 wt % SA to about 2 wt % SA. In some embodiments, no lubricants are used.

Liquid Vehicle

In one or more embodiments, the batch composition mixture 210 comprises a liquid vehicle, which can be provided in a liquid vehicle percentage LV % as a superaddition to 100% of the weight of the inorganics and pore former present in the batch. The LV % in the batch composition mixture 210 may be added to the mixture in an amount of about 15 wt %≤LV %≤50 wt % by super-addition to 100% of the total weight of inorganics plus pore former that are present in the batch composition mixture 210.

In use, the liquid vehicle provides a medium for the organic binder to dissolve in, and thus provides plasticity to the batch composition mixture 210 and also provides wetting of the inorganic particles therein. The liquid vehicle can be an aqueous-based liquid, such as water or water-miscible solvents. In one implementation, the liquid vehicle is water, such as deionized water, but other solvents such as alcohols (e.g., methanol or ethanol) could be used alone or in combination with water.

Processing

The inorganic batch powdered ingredients, organic binder, and pore former, can be intimately blended with a liquid vehicle and one or more processing aids to impart plastic formability and green strength to the plasticized batch composition mixture 210 upon being shaped into a green body 100G. When forming is done by extrusion, most typically a cellulose ether binder such as methylcellulose, hydroxypropyl methylcellulose, and/or combinations thereof, serve as the temporary organic binder. Tall oil and/or oleic acid can serve as a suitable processing aid. The inorganic batch ingredients, organic binder, and pore former are typically mixed together in dry form and then mixed with the liquid vehicle (e.g. water) and the one or more processing aid(s). The amount of liquid vehicle LV % (e.g., water) can vary from one batch composition mixture to another and therefore can be determined by pre-testing the particular batch composition mixture for extrudability, and adjusting, as needed, the LV % to achieve a proper plasticity for extrusion and optimum handling properties.

In addition to the forming and shaping of the green body 100G from the plasticized batch composition mixture 210 by extrusion through an extrusion die other suitable forming methods could be used. For example, uniaxial or isostatic pressing, casting, and injection molding may be used to form the green body 100G. For example, extrusion can be used when the porous ceramic body 100 is embodied as a honeycomb body, such as when embodied for use as a catalytic converter flow-through substrate (e.g., a catalyzed substrate) or a plugged honeycomb body 100G for use in a particulate wall-flow filter application. The resulting green body 100G can be dried, and then fired in a furnace, such as a gas or electric kiln, under conditions effective to convert the green body 100G into a porous ceramic body 100. After firing, the porous ceramic body 100 may be plugged as discussed herein to form a plugged ceramic body 100P.

Firing

In one or more embodiments, the firing conditions effective to convert the green body 100G into a ceramic body 100 can comprise heating the green body 100G to a maximum soak temperature in the range of from 1,340° C. to 1,425° C. and then holding at the maximum soak temperature for a soak time sufficient to produce the cordierite-indialite-pseudobrookite crystalline phase composite structure. The maximum soak temperature is maintained for a soak time sufficient to convert the green body 100G into a ceramic body 100 comprising the cordierite and indialite crystalline phases. The soak time can be from about 6 hours to about 24 hours, for example. The soak time is preceded by a suitably slow heating ramp up and followed by cooling at a rate sufficient slow so as not to thermally shock and crack the dried green body 100G upon heating or the porous ceramic body 100 upon cooling.

Plugging

To obtain a plugged honeycomb body 100P for use in a wall-flow particulate filter application (e.g., DPF or GPF), a portion of the channels of the porous ceramic body 100 comprising a porous ceramic honeycomb body at the inlet end 103 can be plugged, as is known in the art. The plugging may be at or near the ends of the channels 104, and the plugs can be to a depth of about 3 mm to 20 mm, although this depth can vary. In some embodiments, a portion of the channels 104 on the outlet end 105 are plugged, but not at the inlet end 103 (e.g., inlet channels), and another portion of the channels 104 on the inlet end 103 are plugged, but not at the outlet end 105 (e.g., outlet channels). Therefore, each channel 104 is plugged only at one end in fully-plugged embodiments.

In some embodiments, a plugging arrangement can be provided to have every other channel 104 on a given face plugged in a checkered pattern, i.e., in a checkerboard pattern. However, other plugging patterns are possible and not all channels 104 may contain plugs, such as in partial filter embodiments. Some channels 104 may not include a plug, i.e., may be unplugged and thus constitute flow-through channels. Suitable non-limiting plugging materials and plugging processes are described in U.S. Pat. Nos. 4,329,162, 4,557,773, 6,673,300, 7,744,669, and 7,922,951, for example. Other suitable plugging methods, patterns, and plug types may be used.

Example Batch Composition Mixtures

Example embodiments of the disclosure are further described below with respect to certain batch composition mixtures, which are illustrative only and not intended to be limiting. Tables 2A-2E below provide some examples (E1A-E26) of batch composition mixtures 210 useful in forming porous ceramic bodies 100 comprising the cordierite-indialite ceramic material described herein. In particular, example batch mixtures 210 in accordance with embodiments described herein can comprise inorganic ingredients comprising a magnesia source, an alumina source, a silica source, and optionally a phosphorus source, which can be powdered particulate source materials. Tables 2A-2E also provide the nominal oxide chemistry of each example and the dopant chemistry and amount.

The batch composition mixture further comprises a pore former provided in by superaddition $SA_{pf}$ based on 100% of the total weight of the inorganics in the batch composition mixture 210. In some embodiments, the pore former is provided as a XL starch alone or in combination with graphite. Example starches can have a median particle size ($dp_{50}$) and particle size distribution $dp_f$ and $dp_b$ as shown in Table 1, and/or as otherwise described herein.

TABLE 2A

| Example Batch Composition Mixture E1-E5 | | | | | | |
|---|---|---|---|---|---|---|
| Inorganics (wt %) | E1 | E2 | E3 | E3.5 | E4 | E5 |
| Talc B | | | | | | 43.06 |
| Talc C | 40.18 | 41.15 | 42.10 | 41.93 | 43.06 | |
| Alumina 2 | 20.97 | 20.15 | 19.33 | 17.60 | 18.52 | 18.52 |
| Aluminum hydrate, $Al(OH)_3$ | 16.00 | 16.00 | 16.00 | 16.00 | 16.00 | 16.00 |
| Aluminum monohydrate, AlOOH | | | | 2.00 | | |
| Silica 1 | 22.85 | 22.70 | 22.56 | 22.47 | 22.42 | 22.423 |
| Total | 100.00 | 100.00 | 100.00 | 100.00 | 100.00 | 100.00 |
| Pore Formers (wt % $SA_{pf}$) | | | | | | |
| XL Pea Starch | 45.00 | 45.00 | 45.00 | 45.00 | 45.00 | 45.00 |
| Graphite | 10.00 | 10.00 | 10.00 | 10.00 | 10.00 | 10.00 |
| Binders (wt % SA) | | | | | | |
| Methylcellulose | 3.50 | 3.50 | 3.50 | 3.50 | 3.50 | 3.50 |
| Processing Aids (wt % SA) | | | | | | |
| Tall Oil | 1.00 | 1.00 | 1.00 | 1.00 | 1.00 | |
| Oleic Acid | | | | | | 1.00 |
| Dopant and Concentration (wt %) | | | | | | |
| $Mg_3Al_2Si_6O_{18}$ | 5 | 10 | 15 | 15 | 20 | 20 |
| Weight Percent of Oxides (wt %) | | | | | | |
| MgO | 13.84 | 14.18 | 14.52 | 14.50 | 14.85 | 14.85 |
| $Al_2O_3$ | 33.96 | 33.09 | 32.22 | 32.29 | 31.35 | 31.35 |
| $SiO_2$ | 52.20 | 52.73 | 53.26 | 53.21 | 53.79 | 53.79 |
| Total | 100.00 | 100.00 | 100.00 | 100.00 | 100.00 | 100.00 |
| Cell density (cells/in$^2$) | 300 | 300 | 300 | 300 | 300 | 300 |
| Wall thickness (mil) | 8 | 8 | 8 | 8 | 8 | 8 |

TABLE 2B

| Example Batch Composition Mixtures E6-E11 | | | | | | |
|---|---|---|---|---|---|---|
| Inorganics (wt %) | E6 | E7 | E8 | E9 | E10 | E11 |
| Talc C | 43.06 | 43.06 | 43.06 | 42.10 | 42.10 | 43.06 |
| Alumina 2 | 18.52 | 18.52 | 18.52 | 19.33 | 19.33 | 18.52 |
| Aluminum hydrate, $Al(OH)_3$ | 16.00 | 16.00 | 16.00 | 16.00 | 16.00 | 16.00 |
| Silica 1 | 22.42 | 22.42 | 22.42 | 22.56 | 22.56 | 22.42 |
| Total | 100.00 | 100.00 | 100.00 | 100.00 | 100.00 | 100.00 |
| Pore Formers (wt % $SA_{pf}$) | | | | | | |
| XL Corn Starch | | | | 45.00 | 22.00 | 45.00 |
| XL Pea Starch | 22.00 | | | | | |
| XL Potato Starch | | 22.00 | 45.00 | | | |
| Graphite | 5.00 | 5.00 | 10.00 | 10.00 | 5.00 | 10.00 |

TABLE 2B-continued

| Example Batch Composition Mixtures E6-E11 | | | | | | |
|---|---|---|---|---|---|---|
| Inorganics (wt %) | E6 | E7 | E8 | E9 | E10 | E11 |
| Binders (wt % SA) | | | | | | |
| Methylcellulose | 3.50 | 3.50 | 3.50 | 3.50 | 3.50 | 3.50 |
| Processing Aids (wt % SA) | | | | | | |
| Tall Oil | | | | | | 1.00 |
| Oleic Acid | 1.00 | 1.00 | 1.00 | 1.00 | 1.00 | |
| Dopant and Concentration (wt %) | | | | | | |
| $Mg_3Al_2Si_6O_{18}$ | 20 | 20 | 20 | 15 | 15 | 20 |
| Weight Percent of Oxides (wt %) | | | | | | |
| MgO | 14.85 | 14.85 | 14.85 | 14.52 | 14.52 | 14.85 |
| $Al_2O_3$ | 31.35 | 31.35 | 31.35 | 32.22 | 32.22 | 31.35 |
| $SiO_2$ | 53.79 | 53.79 | 53.79 | 53.26 | 53.26 | 53.79 |
| Total | 100.00 | 100.00 | 100.00 | 100.00 | 100.00 | 100.00 |
| Cell density (cells/in$^2$) | 300 | 300 | 300 | 300 | 300 | 300 |
| Wall thickness (mil) | 8 | 8 | 8 | 8 | 8 | 8 |

TABLE 2C

| Example Batch Composition Mixtures E12-E17 | | | | | | |
|---|---|---|---|---|---|---|
| Inorganics (wt %) | E12 | E13 | E14 | E15 | E16 | E17 |
| Talc A | | 43.06 | 18.08 | 14.94 | | |
| Talc B | 43.059 | | | | | |
| Talc C | | | | | 47.19 | 36.02 |
| Magnesium hydroxide | | | 12.00 | 12.00 | | |
| Alumina 2 | 18.52 | 18.52 | 22.80 | 26.11 | 18.43 | 21.06 |
| Aluminum hydrate, $Al(OH)_3$ | 16.00 | 16.00 | | | 16.00 | 16.00 |
| Aluminum monohydrate, AlOOH | | | | | | |
| Silica 1 | 22.42 | 22.42 | 31.12 | 29.38 | 18.38 | 26.92 |
| Clay 1 | | | 16.00 | 16.00 | | |
| Aluminum metaphosphate | | | | 1.57 | | |
| Total | 100.00 | 100.00 | 100.00 | 100.00 | 100.00 | 100.00 |
| Pore Formers (wt % $SA_{pf}$) | | | | | | |
| XL Corn Starch | 45.00 | 45.00 | | | | |
| XL Pea Starch | | | | | 45.00 | 45.00 |
| XL Potato Starch | | | 40.00 | 40.00 | | |
| Graphite | 10.00 | 10.00 | 15.00 | 15.00 | 10.00 | 10.00 |
| Binders (wt % SA) | | | | | | |
| Methylcellulose | 3.50 | 3.50 | 6.00 | 6.00 | 3.50 | 3.50 |
| Processing Aids (wt % SA) | | | | | | |
| Tall Oil | 1.00 | 1.00 | 0.60 | 0.60 | | |
| Oleic Acid | | | | | 1.00 | 1.00 |
| Dopant and Concentration (wt %) | | | | | | |
| $Mg_3Al_2Si_6O_{18}$ | 20 | 20 | 20 | 0 | NA | NA |
| $Mg_3Al_5PO_{18}$ | 0 | 0 | 0 | 4 | NA | NA |
| Weight Percent of Oxides (wt %) | | | | | | |
| MgO | 14.85 | 14.85 | 15.08 | 13.99 | 16.31 | 12.38 |
| $Al_2O_3$ | 31.35 | 31.35 | 31.24 | 35.06 | 31.33 | 33.99 |
| $SiO_2$ | 53.79 | 53.79 | 53.67 | 49.59 | 52.36 | 53.63 |
| $P_2O_5$ | 0.00 | 0.00 | 0.00 | 1.36 | 0.00 | 0.00 |
| Total | 100.00 | 100.00 | 100.00 | 100.00 | 100.00 | 100.00 |
| Cell density (cells/in$^2$) | 300 | 300 | 200 | 200 | 300 | 300 |
| Wall thickness (mil) | 8 | 8 | 12 | 12 | 8 | 8 |

TABLE 2D

| Example Batch Composition Mixtures E18-E22 | | | | | |
|---|---|---|---|---|---|
| Inorganics (wt %) | E18 | E19 | E20 | E21 | E22 |
| Talc C | 38.91 | 44.33 | 43.06 | 43.06 | 43.06 |
| Alumina 2 | 18.61 | 20.87 | 18.52 | 18.52 | 18.52 |
| Aluminum hydrate, $Al(OH)_3$ | 16.00 | 16.00 | 16.00 | 16.00 | 16.00 |
| Silica 1 | 26.49 | 18.80 | 22.42 | 22.42 | 22.42 |
| Total | 100.00 | 100.00 | 100.00 | 100.00 | 100.00 |
| Pore Formers (wt % $SA_{pf}$) | | | | | |
| XL Corn Starch | | | | 25.00 | |
| XL Pea Starch | 45.00 | 45.00 | 25.00 | | 50.50 |
| Graphite | 10.00 | 10.00 | | | |
| Binders (wt % SA) | | | | | |
| Methylcellulose | 3.50 | 3.50 | 3.50 | 3.50 | 3.50 |
| Processing Aids (wt % SA) | | | | | |
| Oleic Acid | 1.00 | 1.00 | 1.00 | 1.00 | 1.00 |
| Dopant and Concentration (wt %) | | | | | |
| $Mg_3Al_2Si_6O_{18}$ | NA | NA | 20 | 20 | 20 |
| $Mg_3Al_5PO_{18}$ | NA | NA | 0 | 0 | 0 |
| Weight Percent of Oxides (wt %) | | | | | |
| MgO | 13.39 | 15.30 | 14.85 | 14.85 | 14.85 |
| $Al_2O_3$ | 31.38 | 33.93 | 31.35 | 31.35 | 31.35 |
| $SiO_2$ | 55.22 | 50.77 | 53.79 | 53.79 | 53.79 |
| Total | 100.00 | 100.00 | 100.00 | 100.00 | 100.00 |
| Cell density (cells/in$^2$) | 300 | 300 | 300 | 300 | 300 |
| Wall thickness (mil) | 8 | 8 | 8 | 8 | 8 |

TABLE 2E

| Example Batch Composition Mixtures E23-E26 | | | | |
|---|---|---|---|---|
| Inorganics (wt %) | E23 | E24 | E25 | E26 |
| Talc C | 43.06 | 43.06 | 40.05 | 40.05 |
| Alumina 1 | 12.35 | 12.35 | 14.47 | 14.47 |
| Alumina 2 | 6.17 | 6.17 | 7.24 | 7.24 |
| Aluminum hydrate, $Al(OH)_3$ | 16.00 | 16.00 | 16.00 | 16.00 |
| Silica 1 | | 22.42 | | 20.61 |
| Silica 2 | 22.42 | | 20.61 | |
| Aluminum metaphosphate | | | 1.64 | 1.64 |
| Total | 100.00 | 100.00 | 100.00 | 100.00 |
| Pore Formers (wt % $SA_{pf}$) | | | | |
| XL Pea Starch | 43.10 | 43.10 | 43.10 | 43.10 |
| Binders (wt % SA) | | | | |
| Methylcellulose | 3.50 | 3.50 | 3.50 | 3.50 |
| Processing Aids (wt % SA) | | | | |
| Oleic Acid | 1.00 | 1.00 | 1.00 | 1.00 |
| Dopant and Concentration (wt %) | | | | |
| $Mg_3Al_2Si_6O_{18}$ | 20 | 20 | 0 | 0 |
| $Mg_3Al_5PO_{18}$ | 0 | 0 | 4 | 4 |
| Weight Percent of Oxides (wt %) | | | | |
| MgO | 14.85 | 14.85 | 13.79 | 13.79 |
| $Al_2O_3$ | 31.35 | 31.35 | 35.09 | 35.09 |
| $SiO_2$ | 53.79 | 53.79 | 49.68 | 49.68 |
| $P_2O_5$ | 0.00 | 0.00 | 1.43 | 1.43 |
| Total | 100.00 | 100.00 | 100.00 | 100.00 |
| Cell density (cells/in$^2$) | 300 | 300 | 300 | 300 |
| Wall thickness (mil) | 8 | 8 | 8 | 8 |

Tables 3A-3F below show processing details, microstructural geometry and properties, and various phase composition as phase fractions in weight percent (wt %) of example ceramic bodies E1A-E26A (after firing) that are manufactured from batch composition mixtures 210 utilizing raw materials from Table 1 and the batch composition mixtures 210 as defined by Tables 2A-2E.

Each of the ceramic body composition examples E1A-E26A in Tables 3A-3F, which correspond directly to batch composition mixture examples E1-E 26 in Tables 2A-2E, were manufactured by extruding honeycomb green bodies 100G. These honeycomb green bodies 100G are made from the various listed batch material mixtures from Tables 2A-2E are then fired in an electric furnace at the listed firing conditions. Example top soak temperatures (° C.) and soak times in hours (hr) are shown.

Calculated oxide weight percentages for the various sources are shown, and these oxide weight percentages are the same in the fired ceramic material and thus are not repeated in Tables 3A-3F. Phase fractions of the various phases present in the cordierite-indialite ceramic material are shown. For example, E2A contains cordierite, indialite, spinel, sapphirine, enstatite, mullite, cristabolite, and an amorphous phase. The phase fractions of all examples E1A-E26A were determined by Reitveid refinement method and X-ray diffraction.

TABLE 3A

| Processing details, properties, and phase composition of example ceramic bodies E1A-E2D after firing | | | | | |
|---|---|---|---|---|---|
| Processing and Attributes | E1A | E2A | E2B | E2C | E2D |
| Soak Temperature (° C.) | 1415 | 1340 | 1370 | 1415 | 1425 |
| Soak Time (hr) | 12 | 12 | 12 | 12 | 12 |
| Porosity (%) | 69.3 | 69.2 | 69.1 | 69.3 | 69.3 |
| $d_{10}$ (μm) | 9.20 | 6.81 | 7.80 | 9.99 | 10.39 |
| $d_{50}$ (μm) | 12.61 | 11.40 | 11.81 | 13.31 | 13.72 |
| $d_{90}$ (μm) | 18.02 | 17.70 | 17.90 | 19.10 | 20.11 |
| $d_f$ | 0.27 | 0.40 | 0.34 | 0.25 | 0.24 |
| $d_b$ | 0.70 | 0.96 | 0.86 | 0.68 | 0.71 |
| CTE 25° C. to 800° C. ($\times 10^{-7}$/° C.) | 5.20 | 11.10 | 8.50 | 4.90 | 4.40 |
| E (GPa) | 1.31 | 1.16 | 1.27 | 1.19 | |
| $E_w$ (GPa) | 4.14 | 3.58 | 3.96 | 3.76 | |
| $E_{w, NMC}$ (GPa) | 5.52 | 5.74 | 5.90 | 5.62 | |
| $Nb^3$ | 0.19 | 0.34 | 0.28 | 0.28 | |
| I-Ratios | | | | | |
| Axial | 0.42 | | | 0.42 | |
| Transverse | 0.87 | | | 0.88 | |
| Phases by Rietveld (%) | | | | | |
| Cordierite | 84.1 | 67.4 | 76.4 | 80.9 | 78.1 |
| Indialite | 12.5 | 18.1 | 17.1 | 15.2 | 18.8 |
| Cordierite + Indialite | 96.6 | 85.5 | 93.5 | 96.1 | 96.9 |
| Spinel | 0.6 | 6.4 | 3.4 | 0.9 | 0.5 |
| Sapphirine | 1.1 | 1.6 | 1.4 | | |
| Enstatite | | | | 1.4 | 1.5 |
| Cristobalite | | 5.5 | 1.1 | | |
| Amorphous Phase | 1.6 | 1.0 | 0.6 | 1.7 | 1.0 |

TABLE 3B

Processing details, properties, and phase composition of example ceramic bodies E3A-E4D after firing

| Processing and Attributes | E3A | E3.5A | E4A | E4B | E4C | E4D |
|---|---|---|---|---|---|---|
| Soak Temperature (° C.) | 1415 | 1425 | 1340 | 1370 | 1415 | 1425 |
| Soak Time (hr) | 12 | 12 | 12 | 12 | 12 | 12 |
| Porosity (%) | 68.8 | 68.7 | 68.9 | 69.3 | 68.5 | 66.5 |
| $d_{10}$ (μm) | 11.48 | 10.86 | 8.86 | 9.81 | 12.67 | 13.90 |
| $d_{50}$ (μm) | 14.71 | 14.12 | 12.79 | 13.41 | 15.94 | 17.33 |
| $d_{90}$ (μm) | 20.98 | 21.37 | 19.12 | 19.88 | 23.84 | 27.44 |
| $d_f$ | 0.22 | 0.23 | 0.31 | 0.27 | 0.21 | 0.20 |
| $d_b$ | 0.65 | 0.74 | 0.80 | 0.75 | 0.70 | 0.78 |
| CTE 25° C. to 800° C. ($\times 10^{-7}$/° C.) | 7.00 | 8.00 | 13.00 | 10.00 | 7.90 | 9.40 |
| E (GPa) | 1.19 | 1.21 | 1.22 | 1.26 | 1.22 | |
| $E_w$ (GPa) | 3.76 | 3.75 | 3.85 | 3.91 | 3.82 | |
| $E_{w,NMC}$ (GPa) | 5.40 | 5.90 | 5.68 | 5.60 | 5.84 | |
| $Nb^3$ | 0.25 | 0.32 | 0.27 | 0.24 | 0.30 | |
| I-Ratios | | | | | | |
| Axial | 0.45 | 0.44 | | | 0.45 | |
| Transverse | 0.88 | 0.87 | | | 0.87 | |
| Phases by Rietveld (%) | | | | | | |
| Cordierite | 76.0 | 64.1 | 68.0 | 74.7 | 69.8 | 63.8 |
| Indialite | 18.4 | 29.5 | 19.5 | 17.5 | 22.2 | 25.5 |
| Cordierite + Indialite | 94.4 | 93.6 | 87.5 | 92.2 | 92.0 | 89.3 |
| Spinel | 0.6 | | 4.1 | 2.3 | 0.7 | 0.6 |
| Sapphirine | | 2.0 | 1.5 | | | |
| Enstatite | 2.6 | 1.6 | | 1.9 | 2.7 | 2.7 |
| Cristobalite | 0.4 | | 4.4 | | | |
| Amorphous Phase | 2.0 | 2.8 | 2.4 | 3.5 | 4.6 | 7.4 |

TABLE 3C

Processing details, properties, and phase composition of example ceramic bodies E5A-E10A after firing

| Processing and Attributes | E5A | E6A | E7A | E8A | E9A | E10A |
|---|---|---|---|---|---|---|
| Soak Temperature (° C.) | 1415 | 1415 | 1415 | 1415 | 1415 | 1415 |
| Soak Time (hr) | 12 | 12 | 12 | 12 | 12 | 12 |
| Porosity (%) | 66.9 | 57.5 | 59.0 | 67.6 | 67.9 | 59.0 |
| $d_{10}$ (μm) | 12.29 | 9.89 | 8.65 | 13.75 | 8.79 | 7.26 |
| $d_{50}$ (μm) | 15.63 | 12.72 | 14.14 | 20.67 | 11.63 | 9.63 |
| $d_{90}$ (μm) | 24.49 | 18.10 | 24.36 | 32.85 | 18.06 | 14.34 |
| $d_f$ | 0.21 | 0.22 | 0.39 | 0.33 | 0.24 | 0.25 |
| $d_b$ | 0.78 | 0.65 | 1.11 | 0.92 | 0.80 | 0.74 |
| CTE 25° C. to 800° C. ($\times 10^{-7}$/° C.) | 10.90 | 8.20 | 7.20 | 7.50 | 10.20 | 6.90 |
| E (GPa) | 1.50 | 2.91 | 2.76 | 1.27 | 1.21 | 2.58 |
| $E_w$ (GPa) | 4.81 | 9.31 | 8.39 | 4.13 | 3.81 | 7.98 |
| $E_{w,NMC}$ (GPa) | 6.76 | 14.90 | 15.52 | 7.15 | 4.54 | 12.10 |
| $Nb^3$ | 0.23 | 0.34 | 0.48 | 0.41 | 0.11 | 0.29 |
| I-Ratios | | | | | | |
| Axial | 0.44 | 0.41 | 0.43 | 0.46 | 0.45 | 0.40 |
| Transverse | 0.84 | 0.89 | 0.90 | 0.87 | 0.87 | 0.89 |
| Phases by Rietveld (%) | | | | | | |
| Cordierite | 72.8 | 71.7 | 70.2 | 64.4 | 79.0 | 78.7 |
| Indialite | 21.0 | 20.6 | 21.1 | 24.3 | 16.4 | 17.6 |
| Cordierite + Indialite | 93.8 | 92.3 | 91.3 | 88.7 | 95.4 | 96.3 |
| Spinel | | | | | 1.1 | |
| Enstatite | 1.5 | 5.1 | 1.7 | 3.1 | 1.3 | 1.5 |
| Cristobalite | | | | 0.3 | | |
| Amorphous Phase | 4.7 | 2.6 | 7.0 | 7.8 | 2.2 | 2.3 |

TABLE 3D

Processing details, properties, and phase composition of example ceramic bodies E11A-E16A after firing

| Processing and Attributes | E11A | E12A | E13A | E14A | E15A | E16A |
|---|---|---|---|---|---|---|
| Soak Temperature (° C.) | 1415 | 1415 | 1415 | 1410 | 1410 | 1415 |
| Soak Time (hr) | 12 | 12 | 12 | 10 | 10 | 12 |
| Porosity (%) | 63.9 | 66.4 | 63.3 | 65.5 | 67.3 | 67.6 |
| $d_{10}$ (μm) | 9.22 | 9.39 | 8.62 | 10.55 | 8.14 | 12.26 |
| $d_{50}$ (μm) | 12.13 | 12.59 | 11.28 | 16.69 | 16.24 | 15.41 |
| $d_{90}$ (μm) | 18.32 | 20.92 | 15.31 | 26.09 | 27.40 | 25.08 |
| $d_f$ | 0.24 | 0.25 | 0.24 | 0.37 | 0.50 | 0.20 |
| $d_b$ | 0.75 | 0.91 | 0.59 | 0.93 | 1.19 | 0.83 |
| CTE 25° C. to 800° C. ($\times 10^{-7}$/° C.) | 12.70 | 13.60 | 12.80 | 12.80 | 13.80 | 12.50 |
| E (GPa) | | | | 2.98 | 2.56 | 1.32 |
| $E_w$ (GPa) | | | | 6.81 | 6.23 | 4.12 |
| $E_{w,NMC}$ (GPa) | | | | 10.24 | 7.59 | 5.97 |
| $Nb^3$ | | | | 0.28 | 0.12 | 0.25 |
| I-Ratios | | | | | | |
| Axial | | | | 0.62 | 0.63 | 0.45 |
| Transverse | | | | 0.79 | 0.78 | 0.87 |
| Phases by Rietveld (%) | | | | | | |
| Cordierite | 78.8 | | | 58.7 | 59.0 | 66.8 |
| Indialite | 17.0 | | | 30.2 | 31.7 | 21.1 |
| Cordierite + Indialite | 95.8 | | | 88.9 | 90.7 | 87.9 |
| Spinel | 1.0 | | | 0.8 | | 1.4 |
| Sapphirine | | | | | 1.7 | |
| Enstatite | 1.5 | | | 2.6 | 0.7 | 9.8 |
| Mullite | 0.3 | | | | 2.0 | |
| Amorphous Phase | 1.4 | | | 7.7 | 4.9 | 0.9 |

TABLE 3E

Processing details, properties, and phase composition of example ceramic bodies E17A-E21A after firing

| Processing and Attributes | E17A | E18A | E19A | E20A | E21A |
|---|---|---|---|---|---|
| Soak Temperature (° C.) | 1415 | 1415 | 1415 | 1415 | 1415 |
| Soak Time (hr) | 12 | 12 | 12 | 12 | 12 |
| Porosity (%) | 70.4 | 70.1 | 70.4 | 58.9 | 58.0 |
| $d_{10}$ (μm) | 9.37 | 11.48 | 9.06 | 8.76 | 7.12 |
| $d_{50}$ (μm) | 12.35 | 14.52 | 12.85 | 11.54 | 9.38 |
| $d_{90}$ (μm) | 17.64 | 20.92 | 19.08 | 17.23 | 14.72 |
| $d_f$ | 0.24 | 0.21 | 0.30 | 0.24 | 0.24 |
| $d_b$ | 0.67 | 0.65 | 0.78 | 0.73 | 0.81 |
| CTE 25° C. to 800° C. ($\times 10^{-7}$/° C.) | 9.30 | 9.60 | 5.40 | 7.00 | 8.60 |
| E (GPa) | 1.38 | 1.12 | 1.07 | 2.35 | 2.37 |
| $E_w$ (GPa) | 4.15 | 3.42 | 3.20 | 7.86 | 7.76 |
| $E_{w,NMC}$ (GPa) | 5.65 | 5.26 | 5.47 | 14.35 | 12.50 |
| $Nb^3$ | 0.20 | 0.30 | 0.40 | 0.47 | 0.34 |
| I-Ratios | | | | | |
| Axial | 0.43 | 0.42 | 0.41 | 0.43 | 0.46 |
| Transverse | 0.88 | 0.87 | 0.87 | 0.88 | 0.88 |
| Phases by Rietveld (%) | | | | | |
| Cordierite | 72.5 | 73.0 | 79.9 | 72.4 | 72.6 |
| Indialite | 16.4 | 19.8 | 13.2 | 19.3 | 19.3 |
| Cordierite + Indialite | 88.9 | 92.8 | 93.1 | 91.7 | 91.9 |
| Spinel | | | 4.5 | | |
| Sapphirine | 1.7 | 1.9 | | 0.8 | 1.0 |
| Enstatite | | 2.1 | 3.0 | 2.0 | 1.9 |
| Mullite | 2.9 | | | | |
| Cristobalite | 3.4 | 3.3 | | | |
| Amorphous Phase | 3.2 | | | 5.5 | 5.2 |

TABLE 3F

Processing details, properties, and phase composition of example ceramic bodies E22A-E26A after firing

| Processing and Attributes | E22A | E23A | E24A | E25A | E26A |
|---|---|---|---|---|---|
| Soak Temperature (° C.) | 1415 | 1415 | 1415 | 1415 | 1415 |
| Soak Time (hr) | 12 | 12 | 12 | 12 | 12 |
| Porosity (%) | 67.6 | 61.9 | 63.4 | 67.8 | 68.8 |
| $d_{10}$ (μm) | 10.00 | 15.19 | 14.95 | 15.15 | 12.63 |
| $d_{50}$ (μm) | 13.19 | 20.95 | 18.70 | 20.07 | 16.32 |
| $d_{90}$ (μm) | 20.78 | 58.93 | 34.45 | 34.82 | 25.50 |
| $d_f$ | 0.24 | 0.27 | 0.20 | 0.24 | 0.23 |
| $d_b$ | 0.82 | 2.09 | 1.04 | 0.98 | 0.79 |
| CTE 25° C. to 800° C. ($\times 10^{-7}$/° C.) | 12.40 | 14.70 | 14.20 | 10.80 | 10.90 |
| E (GPa) | 1.54 | 1.63 | 1.61 | 1.08 | 1.12 |
| $E_w$ (GPa) | 5.10 | 5.70 | 5.51 | 3.56 | 3.57 |
| $E_{w,NMC}$ (GPa) | 6.54 | 6.90 | 7.07 | 4.33 | 4.58 |
| $Nb^3$ | 0.16 | 0.12 | 0.16 | 0.12 | 0.16 |
| I-Ratios | | | | | |
| Axial | 0.47 | 0.55 | 0.53 | 0.50 | 0.53 |
| Transverse | 0.85 | 0.79 | 0.80 | 0.84 | 0.83 |
| Phases by Rietveld (%) | | | | | |
| Cordierite | 76.3 | 70.5 | 63.5 | 61.1 | 64.7 |
| Indialite | 16.2 | 19.8 | 27.3 | 29.2 | 26.1 |
| Cordierite + Indialite | 92.5 | 90.3 | 90.8 | 90.3 | 90.8 |
| Spinel | | | | 0.5 | 0.5 |
| Sapphirine | 0.8 | 1.6 | 1.7 | 0.6 | 0.5 |
| Enstatite | 2.0 | 2.0 | 1.9 | 0.5 | 0.6 |
| Mullite | | | | 1.8 | 2.1 |
| Cristobalite | | 0.6 | | | |
| Amorphous Phase | 4.7 | 5.5 | 5.6 | 6.4 | 5.5 |

Pore size distributions of the ceramic body 100 were measured by mercury intrusion porosimetry using an Autopore® IV 9520 Mercury Porosimeter available from Micrometrics. In the measurement system, pressure is increased so that mercury penetrates narrower pores and fills an increasing volume of the porosity until a critical pressure is reached where the mercury spans the specimen.

Thermal expansion was measured for bar-shaped samples with dimensions of approximately 0.25"×0.25"×2" (0.64×0.64×5.1 cm) during heating from room temperature to 1000° C. at a rate of 4° C./min and subsequent cooling to room temperature (25° C.). For the data reported, the long axis of the test bar was oriented in the direction of the honeycomb channels 104, thus providing the thermal expansion in the axial direction of the honeycomb body 100. Average thermal expansion coefficient from 25° C. to 800° C. is defined as L(800° C.)-L(25° C.)/775° C.

Bar-shaped samples with dimension 5"×1"×0.5" (12.7×2.54×1.27 cm) and the long axis being oriented in the direction of the honeycomb channels 104 were used to measure the elastic modulus (E) by sonic resonance. Samples were heated to 1200° C. and cooled back to room temperature. For each temperature the elastic modulus was directly derived from the resonance frequency and normalized for sample, geometry and weight by referring to ASTM C 1198-01.

FIGS. 4A illustrates a scanning electron microscope (SEM) micrograph of polished fired ware of Example E3A demonstrating magnification of the phase distributions with the cordierite and indialite phases are shown as darker grey, the porosity as black. The phases present in the ceramic bodies 100 were identified by X-ray diffraction (XRD). A Phillips X'Pert diffraction system equipped with an X'Celerator high speed detector was utilized. High resolution spectra were typically acquired from 15° to 100° (2θ). Rietveld refinement was used for quantification of the phase percentages.

Figure 5:
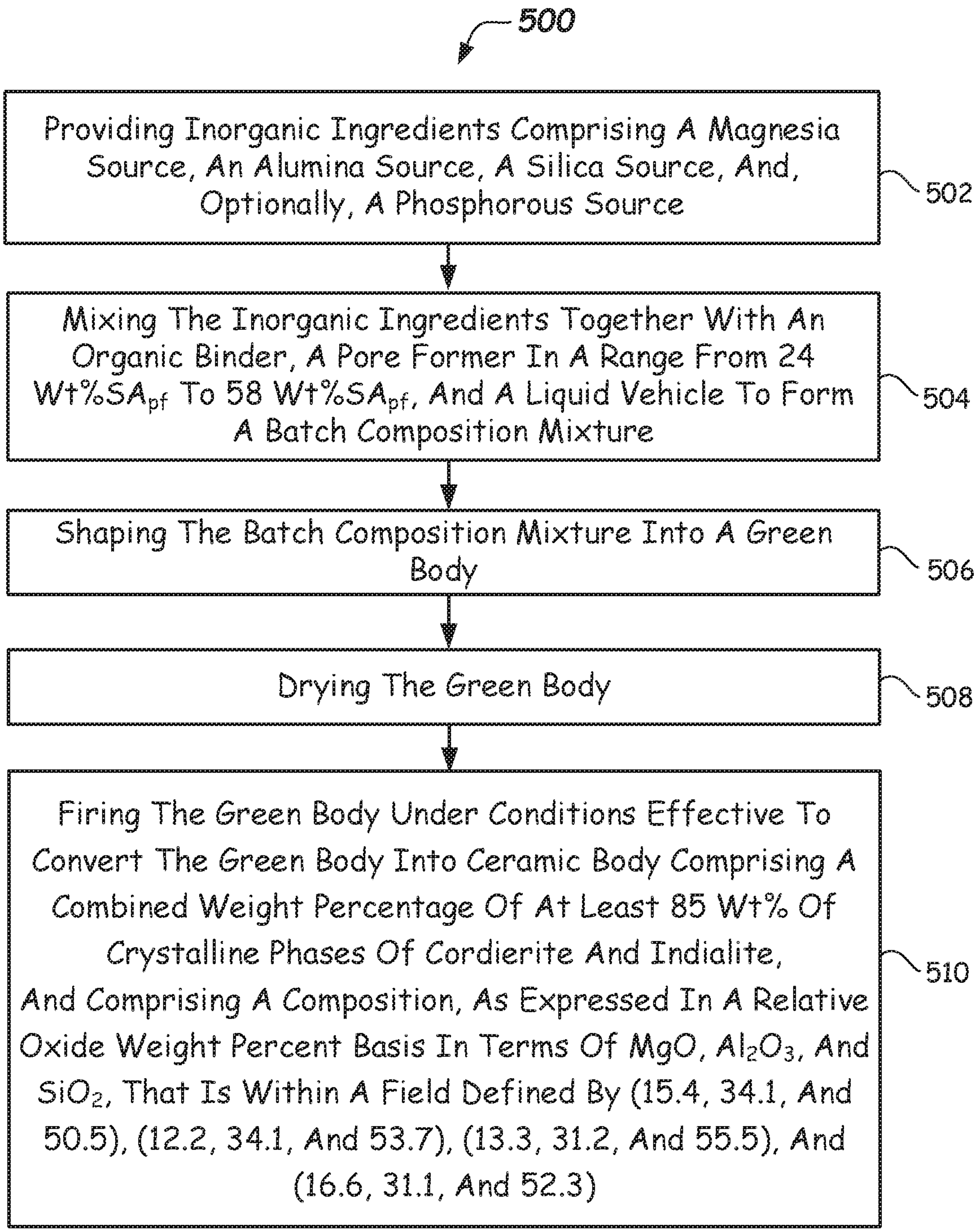
FIG. 5 illustrates a method of manufacturing a ceramic body comprising a cordierite and indialite crystalline structured ceramic material according to one or more embodiments of the disclosure.

FIG. 5 illustrates a method of manufacturing a cordierite-containing ceramic body 100. The method 500 comprises, in block 502, providing inorganic ingredients comprising: a magnesia source, an alumina source, a silica source, and, optionally, a phosphorus source. The method 500 further comprises, in block 504, mixing the inorganic ingredients together with an organic binder, a pore former in a range from 24 wt % $SA_{pf}$ to 58 wt % $SA_{pf}$, and a liquid vehicle to form a batch composition mixture, wherein wt % $SA_{pf}$ is weight percent addition of the pore former by superaddition based on 100% of the total weight of the inorganics.

The method 500 further comprises, in block 506, shaping the batch composition mixture (batch composition mixture 210) into a green body (e.g., green body 100G). Shaping the batch composition mixture 210 into the green body 100G can comprise extrusion of the batch composition mixture 210 through an extrusion die 218 to form the green body 100G. Optionally, shaping may be by any other suitable method. The green body 100G may be dried after extrusion in block 508, as is described herein.

The method 500 further comprises, in block 510, firing the green body (e.g., green body 100G) under conditions effective to convert the green body (e.g., green body 100G) into the porous ceramic body (e.g., porous ceramic body 100) comprising a combined weight percentage of at least 85 wt % of crystalline phases of cordierite and indialite and comprising a composition, as expressed in a relative oxide weight percent basis in terms of MgO, $Al_2O_3$, and $SiO_2$, that is within a field defined by (15.4, 34.1, and 50.5), (12.2, 34.1, and 53.7), (13.3, 31.2, and 55.5), and (16.6, 31.1, and 52.3).

In some embodiments, the firing conditions effective to convert the green body (e.g., green body 100G) into a porous ceramic body 100 can comprise heating the green body 100 to a peak soak temperature in the range from 1340° C. to 1425° C. and maintaining the soak temperature for a soak time sufficient to convert the green body 100G into the ceramic body 100. Afterword, the porous ceramic body 100 can be cooled at a sufficiently slow rate to avoid cracking. The soak may be preceded by a ramp at a sufficiently slow rate so that cracking is avoided, especially during pore former burnout.

It will be apparent to those skilled in the art that various modifications and variations can be made to the various embodiments disclosed herein without departing from the scope of the disclosure. Thus, it is intended that the present disclosure cover the modifications and variations of the embodiments disclosed provided they come within the scope of the claims and their equivalents.

What is claimed is:

1. A porous ceramic body comprising:

a predominant crystalline phase of non-stoichiometric cordierite and a composition on a relative oxide weight percent basis in terms of MgO, $Al_2O_3$, and $SiO_2$ that is within a field defined by (15.4, 34.1, and 50.5), (12.2, 34.1, and 53.7), (13.3, 31.2, and 55.5), and (16.6, 31.1, and 52.3), where the composition on an aggregate oxide basis is 5 wt% to 24 wt% of $Mg_3Al_2Si_6O_{18}$ and 76 wt% to 95 wt% $Mg_2Al_4Si_5O_{18}$;

% P≤50%; and $d_f \leq 0.50$, wherein % P is average bulk porosity by volume, and $d_f=(d_{50}-d_{10})/d_{50}$, wherein $d_{50}$ is a median pore size of the porous ceramic body.

2. The porous ceramic body of claim 1, wherein the composition on the relative oxide weight percent basis in terms of MgO, $Al_2O_3$, and $SiO_2$ is within a field defined by (13.5, 34.1, and 52.4), (12.2, 34.1, and 53.7), (13.3, 31.2, and 55.5) and (14.7, 31.2, and 54.2).

3. The porous ceramic body of claim 1, wherein the composition on the relative oxide weight percent basis in terms of MgO, $Al_2O_3$, and $SiO_2$ is within a field defined by (15.4, 34.1, and 50.5), (14.3, 34.1, and 51.6), (14.5, 31.7, and 53.9), (14.7, 31.2, and 54.2), and (16.6, 31.1, and 52.3).

4. The porous ceramic body of claim 1, wherein 55%≤% P≤72%.

5. The porous ceramic body of claim 1, wherein 60%≤% P≤72%.

6. The porous ceramic body of claim 1, wherein $d_f \leq 0.22$.

7. The porous ceramic body of claim 1, wherein $0.20 \leq d_f \leq 0.30$.

8. The porous ceramic body of claim 1, wherein $0.20 \leq d_f \leq 0.25$.

9. The porous ceramic body of claim 1, wherein:

% P≥60%;

$d_{50} \geq 10$ µm;

df≤0.25; and

CTE≤10×$10^{-7}$/° C., wherein CTE is a coefficient of thermal expansion of the porous ceramic body as measured from 25° C. to 800° C.

10. The porous ceramic body of claim 1, wherein:

% P≥65%;

$d_{50} \geq 12$ µm;

df≤0.22; and

4×$10^{-7}$/° C.≤CTE≤10×$10^{-7}$/° C., wherein CTE is a coefficient of thermal expansion of the porous ceramic body as measured from 25° C. to 800° C.

11. The porous ceramic body of claim 1, wherein:
$55\% \leq \%\ P \leq 72\%$;
$8\ \mu m \leq d_{50} \leq 22\ \mu m$;
$0.20 \leq df \leq 0.50$; and
$4 \times 10^{-7}/°\ C. \leq CTE \leq 14 \times 10^{-7}/°\ C.$ 12. The porous ceramic body of claim 1, wherein the body is a honeycomb body.

13. The porous ceramic body of claim 1, wherein a weight percentage of the crystalline phase of the non-stoichiometric cordierite ranges from 54 wt % to 77 wt %.

14. The porous ceramic body of claim 1, further comprising a crystalline phase of indialite, and wherein a weight percentage of the crystalline phase of the indialite ranges from 16 wt % to 33 wt %.

15. The porous ceramic body of claim 1, further comprising a crystalline phase of indialite, and wherein a combined weight percentage of the crystalline phase of the non-stoichiometric cordierite and the crystalline phase of the indialite ranges from 85 wt % to 97 wt %.

16. The porous ceramic body of claim 1, further comprising $d_b \leq 0.70$, wherein $d_b = (d_{90} - d_{10})/d_{50}$.

17. A porous ceramic body comprising:
a predominant crystalline phase of non-stoichiometric cordierite and a composition on a relative oxide weight percent basis in terms of MgO, $Al_2O_3$, and $SiO_2$ that is within a field defined by (15.4, 34.1, and 50.5), (12.2, 34.1, and 53.7), (13.3, 31.2, and 55.5), and (16.6, 31.1, and 52.3), wherein the composition comprises a solid solution of $Mg_2Al_4Si_5O_{18}$ with $Mg_3Al_5P_3O_{18}$, $Mg_2Al_5Si_3PO_{18}$, $Mg_3Al_3Si_4PO_{18}$, or any combination thereof;
$\%\ P \geq 50\%$; and
$d_f \leq 0.50$,
wherein % P is average bulk porosity by volume, and $d_f = (d_{50} - d_{10})/d_{50}$, wherein $d_{50}$ is a median pore size of the porous ceramic body.

18. A porous ceramic body comprising:
a predominant crystalline phase of non-stoichiometric cordierite and a composition on a relative oxide weight percent basis in terms of MgO, $Al_2O_3$, and $SiO_2$ that is within a field defined by (15.4, 34.1, and 50.5), (12.2, 34.1, and 53.7), (13.3, 31.2, and 55.5), and (16.6, 31.1, and 52.3), wherein the composition comprises a solid solution in the porous ceramic body which comprises: 1 wt % to 9 wt % $Mg_3Al_5P_3O_{18}$, 1 wt % to 14 wt % $Mg_2Al_5Si_3PO_{18}$, 1 wt % to 8 wt % $Mg_3Al_3Si_4PO_{18}$, or combinations thereof, and $Mg_2Al_4Si_5O_{18}$;
$\%\ P \geq 50\%$; and
$d_f \leq 0.50$,
wherein % P is average bulk porosity by volume. and $d_f = (d_{50} - d_{10})/d_{50}$, wherein $d_{50}$ is a median pore size of the porous ceramic body.

* * * * *